United States Patent
Pozas Trevino et al.

(10) Patent No.: US 9,202,143 B2
(45) Date of Patent: Dec. 1, 2015

(54) AUTOMATIC PHOTO GROUPING BY EVENTS

(71) Applicant: Microsoft Corporation, Redmond, WA (US)

(72) Inventors: Jorge F. Pozas Trevino, Seattle, WA (US); Vinayak N. Suley, Kirkland, WA (US); Greg Edmiston, Seattle, WA (US); Jose Emmanuel Miranda-Steiner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 126 days.

(21) Appl. No.: 13/872,171

(22) Filed: Apr. 29, 2013

(65) Prior Publication Data
US 2014/0321762 A1    Oct. 30, 2014

(51) Int. Cl.
*G06K 9/62* (2006.01)
*G11B 27/28* (2006.01)
*G11B 27/32* (2006.01)

(52) U.S. Cl.
CPC ............. *G06K 9/628* (2013.01); *G11B 27/28* (2013.01); *G11B 27/329* (2013.01)

(58) Field of Classification Search
CPC ............ G06K 9/00664; G06K 9/6218; G06K 2209/01; G06K 9/3241; G06K 9/00228; G06T 2207/10016; G06T 7/401
USPC ........................... 382/224–225, 103, 108, 118
See application file for complete search history.

(56) References Cited

U.S. PATENT DOCUMENTS

| | | | |
|---|---|---|---|
| 7,953,422 B2 | 5/2011 | Friedmann | |
| 2004/0004663 A1 | 1/2004 | Kahn et al. | |
| 2005/0128305 A1 | 6/2005 | Hamasaki et al. | |
| 2006/0220983 A1 | 10/2006 | Isomura et al. | |
| 2007/0115373 A1 | 5/2007 | Gallagher et al. | |
| 2008/0295031 A1 | 11/2008 | Miyazaki | |
| 2010/0121852 A1 | 5/2010 | Kim | |
| 2011/0099199 A1 | 4/2011 | Stalenhoef et al. | |
| 2011/0115943 A1 | 5/2011 | Sassa | |
| 2012/0066573 A1 | 3/2012 | Berger et al. | |
| 2012/0096361 A1 | 4/2012 | Osten | |
| 2012/0301039 A1* | 11/2012 | Maunder et al. | ............. 382/225 |
| 2012/0328163 A1 | 12/2012 | Panzer et al. | |
| 2013/0013683 A1 | 1/2013 | Elliott | |

FOREIGN PATENT DOCUMENTS

| | | |
|---|---|---|
| EP | 0990996 A2 | 4/2000 |
| EP | 1879373 A1 | 1/2008 |

OTHER PUBLICATIONS

Perez, Luis, "iPhoto 09 Basics", Retrieved at <<http://etc.usf.edu/te_mac/movies/pdf/iphoto09.pdf>> Retrieved Date: Jan. 17, 2013, pp. 14.

"International Search Report & Written Opinion for PCT Patent Application No. PCT/US2013/058837", Mailed Date: Dec. 11, 2013, Filed Date: Sep. 10, 2013, 10 Pages.

* cited by examiner

*Primary Examiner* — Ruiping Li
(74) *Attorney, Agent, or Firm* — Julie Kane Akhter; Danielle Johnston-Holmes; Micky Minhas

(57) ABSTRACT

Intuitive photo grouping is accomplished utilizing photo metadata information, including photos' timestamps, GPS information, name and storage folder identity, to automatically generate logical and meaningful event photo groupings for users.

20 Claims, 19 Drawing Sheets

AUTOMATIC PHOTO GROUPING BY EVENTS

BACKGROUND

Users often keep and store in computer-based databases many images, also referred to herein as pictures, photographs or photos. The more photos a user has stored the more time and effort it generally requires for the user to arrange these photos into meaningful groups based on the views and/or events they pictorially represent. This arrangement can be further complicated when a user's group of photos are compiled from more than one source, such as, different photographic-capture devices and alternative sources, including various sites and portals via the internet.

Thus, it is desirable to have the capability to automatically analyze a group, or all, of a user's stored photos and arrange them into logical event groups based on the subject and/or event that they represent. The user can thereafter decide to maintain the automatic grouping, further refine the grouping, or ignore the grouping as they see fit. It is further desirable to orchestrate this automatic grouping based on one or more factors of each of the photos in the user's group of stored photos.

SUMMARY

This summary is provided to introduce a selection of concepts in a simplified form which are further described below in the Detailed Description. This summary is not intended to identify key or essential features of the claimed subject matter, nor is it intended to be used as an aid in determining the scope of the claimed subject matter.

Embodiments discussed herein include systems and methods for utilizing photo metadata to automatically group a set of user photos into various logical groups.

BRIEF DESCRIPTION OF THE DRAWINGS

These and other features will now be described with reference to the drawings of certain embodiments and examples which are intended to illustrate and not to limit, and in which.

DETAILED DESCRIPTION

Figure 1:
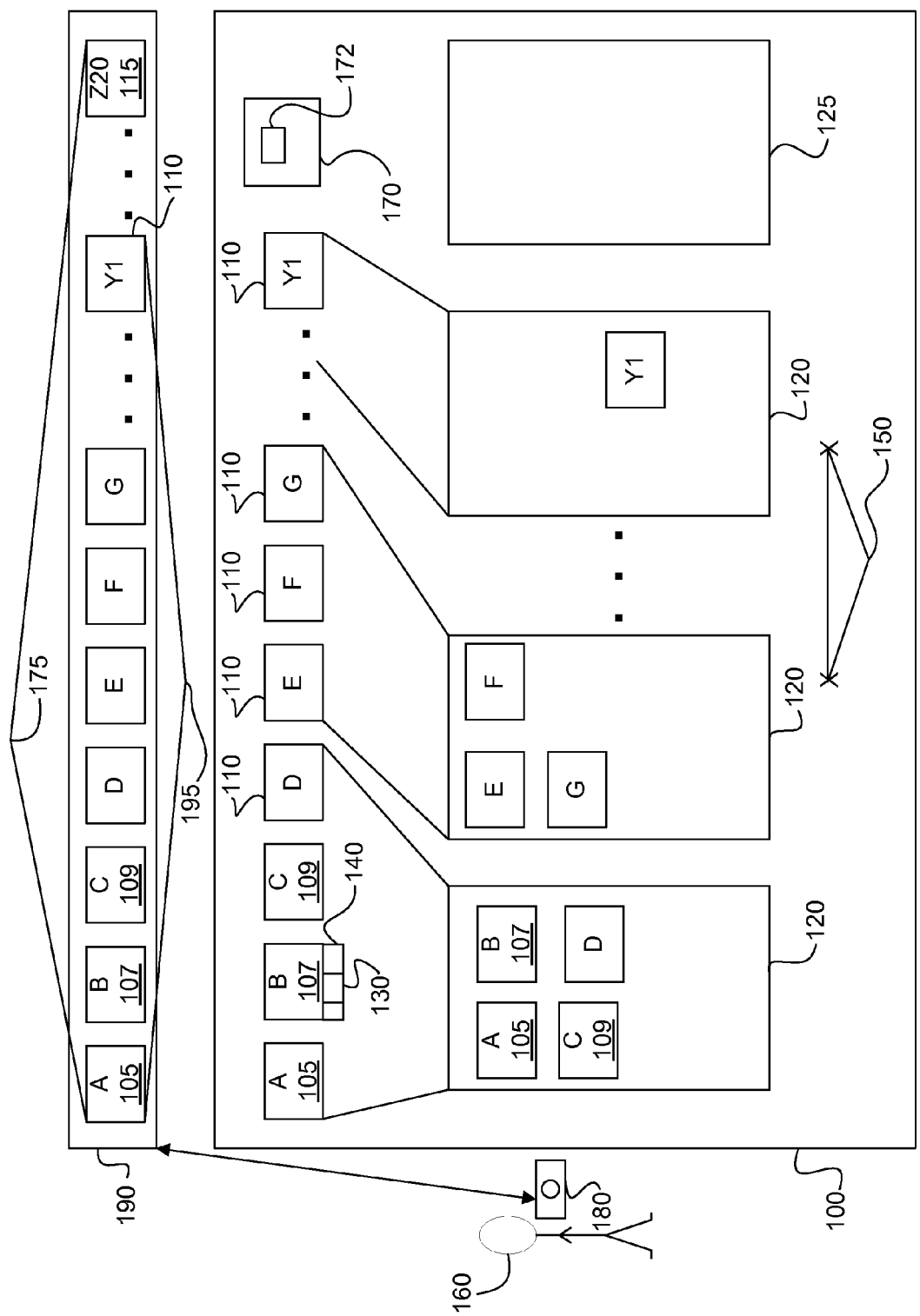
FIG. 1 depicts an embodiment automatic photo grouping environment (APGE).

In the following description, for purposes of explanation, numerous specific details are set forth in order to provide a thorough understanding of embodiments described herein. It will be apparent however to one skilled in the art that the embodiments may be practiced without these specific details. In other instances well-known structures and devices are either simply referenced or shown in block diagram form in order to avoid unnecessary obscuration. Any and all titles used throughout are for ease of explanation only and are not for any limiting use.

As is known, people, also referred to herein as users, 160 take pictures, or photos, 110, utilizing a photographic-capable device 180, e.g., camera, cellphone, etc. For ease of discussion all photographic-capable devices 180 are also referred to herein generically as cameras 180. The photos 110 can thereafter be stored, or restored, in storage 190 on, e.g., a computer, a storage device, in a computing cloud, etc.

In an embodiment a user's pictures 110, when taken, are stored on the camera 180 they are captured with and/or restored in storage 190 tagged with metadata 140 that assists to characterize the accompanying picture 110. In an embodiment a photo's metadata 140 includes a timestamp 130 identifying when the picture 110 was taken and initially stored.

In a first embodiment automatic photo grouping environment 100, shown in FIG. 1, also referred to herein as the APGE 100, a user's pictures 110 are analyzed and grouped into one or more events 120, also referred to herein as event groups 120, utilizing the criteria 170 of the time 172 that the pictures 110 were taken.

In an embodiment APGE 100 a set of user's pictures 175 stored on a camera 180 and/or in storage 190 are initially ordered from most recently taken to the earliest one taken based on each picture's accompanying timestamp 130. Thereafter, in the embodiment the APGE 100 analyzes the most current picture 105 first to determine its timestamp 130. In the embodiment the APGE 100 then analyzes the second most current picture 107 to determine its timestamp 130. In the embodiment the APGE 100 uses the timestamps 130 from the first two pictures 105 and 107 to determine if they are from the same event 120 and, should therefore, be grouped together.

In an embodiment the APGE 100 determines that the pictures 105 and 107 belong to the same event 120 if they are within a predefined event time range 150 of each other. In an aspect of this embodiment the pictures 105 and 107 are grouped together by the APGE 100 if their timestamps 130 are within four (4) hours of each other. In other aspects of this embodiment the pictures 105 and 107 are grouped together by the APGE 100 if their timestamps 130 are within other event time ranges 150 of each other, e.g., two (2) hours, six (6) hours, etc.

In an aspect of this embodiment the event time range 150 can be programmed by a user 160. In an aspect of this embodiment a predetermined event time range 150 can be altered by a user 160.

In an aspect of this embodiment the event time range 150 is the same for each event grouping 120 of photos 110. In other words, all the photos 110 in a first event group 120 are grouped based on the same event time range 150 as all the photos 110 in a second event group 120, and so on.

As noted, in an embodiment the APGE 100 determines that the pictures 105 and 107 belong to the same event 120 if they are within the event time range 150 of each other. In an embodiment the APGE 100 then analyzes the third most current picture 109 to determine its timestamp 130. In an embodiment the APGE 100 thereafter determines that pictures 107 and 109 belong to the same event 120 if they are within the event time range 150 of each other.

It will be noted that in this embodiment while the event time range 150 used to determine if any two pictures 110 should be grouped together remains the same its start and end times change based on the timestamp 130 of the previous picture 110 analyzed and grouped by the APGE 100. Thus, in this embodiment picture 109 can be grouped with picture 105 even though the timestamps 130 for pictures 105 and 109 are not within the event time range 150, as long as picture 105 is grouped with picture 107 and thereafter picture 107 is grouped with picture 109.

Figure 2A:
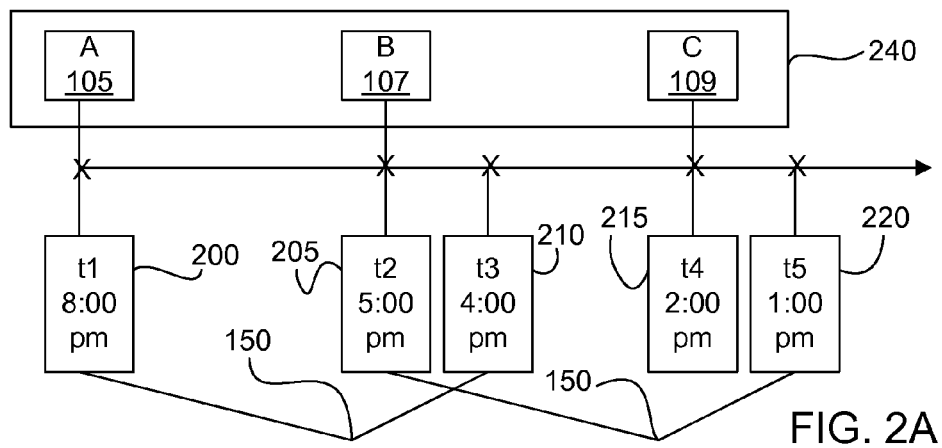
FIGS. 2A-2B depict exemplary automatic photo groupings utilizing the APGE of FIG. 1 where photo timestamps are the criteria for grouping.

For example, and referring to FIG. 2A, assume that the event time range 150 is four (4) hours, Picture A 105 was taken at time t1 200, Picture B 107 was taken at time t2 205, three (3) hours earlier, and Picture C 109 was taken at time t4 215, again, three (3) hours earlier. In determining whether the first and second pictures, 105 and 107, should be grouped in this example the APGE 100 uses the event time range 150 of four (4) hours with a start time t1 200, i.e., the timestamp 130 of the first picture 105 being analyzed, and an end time t3 210 of four (4) hours earlier as the pictures 105, 107, 109, etc. are initially ordered from most recent to least recent. In this example, as Picture B 107 was taken three (3) hours earlier than Picture A 105 the APGE 100 groups Picture A 105 and Picture B 107 into a same first event group 240.

In determining whether the third picture 109 should be grouped into the first event group 240 the APGE 100 uses the same event time range 150 of four (4) hours but now the start time for the event time range 150 is time t2 205 when Picture B 107 was taken. In this example the end time for the event time range 150 is again four (4) hours earlier, now time t5 220. In this example, as Picture C 109 was taken only three (3) hours earlier than Picture B 107 it falls within the four (4) hour event time range 150 of time t2 205 and time t5 220. Thus, in this example the APGE 100 will group Picture C 109 with Picture B 107, which is already grouped with Picture A 105, in the first event group 240.

Figure 2B:
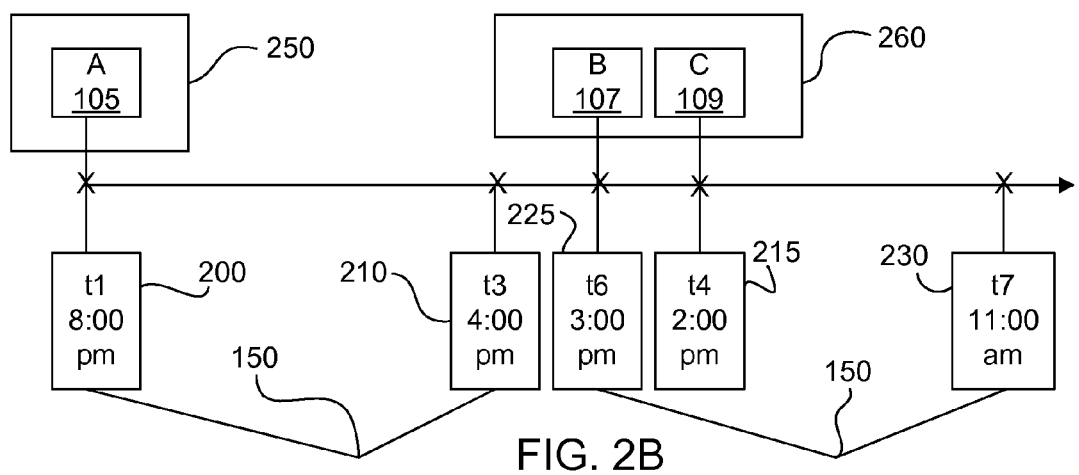

In an embodiment the APGE 100 starts a new group 120 when a picture 110 falls without the event time range 150. Thus, for example, and referring to FIG. 2B, assume that the event time range 150 is again four (4) hours, Picture A 105 was taken at time t1 200, Picture B 107 was taken five (5) hours earlier, at time t6 225, and Picture C 109 was taken at time t4 215, one (1) hour earlier than Picture B 107. In determining whether the first 105 and second 107 pictures should be grouped in this example the APGE 100 uses the event time range 150 of four (4) hours with a start time t1 200, i.e., the timestamp 130 of the first picture 105 being analyzed, and an end time t3 210 of four (4) hours earlier. In this second example Picture B 107 was taken more than four (4) hours earlier than Picture A 105 and thus Picture B 107 falls without the event time range 150 of time t1 200 to time t3 210. Thus, in this second example the APGE 100 will not group pictures 105 and 107 together. In this second example the APGE 100 will group Picture A 105 in a first event group 250 and Picture B 107 into a second event group 260.

In determining whether the third picture 109 should be grouped into the second event group 260 the APGE 100 uses the same event time range 150 of four (4) hours but now the start time for the event time range 150 is time t6 225, when Picture B 107 was taken. In this example the end time for the event time range 150 is again four (4) hours earlier, now time t7 230. In this example, as Picture C 109 was taken only one (1) hour earlier than Picture B 107 it falls within the four (4) hour event time range 150 of time t6 225 to time t7 230, and thus, the APGE 100 will group Picture C 109 with Picture B 107 into the second event group 260.

In an embodiment the APGE 100 continues to process the user's pictures 110 from most recent to least recent in the same fashion, comparing the timestamp 130 of a current picture 110 with the timestamp 130 of an immediately prior picture 110 to determine if the two pictures 110 fall within the event time range 150. In an embodiment if the two currently compared pictures 110 do fall within the event time range 150 the APGE 100 groups them together into the same event group 120. In an embodiment if two compared pictures 110 do not fall within the event time range 150 the APGE 100 places the current picture 110 into a new event group 120 and goes on to compare its timestamp 130 with the timestamp 130 of the next time-ordered picture 110 in the user's set of pictures 175.

In an embodiment any picture 110 in the set of user's pictures 175 that does not have a timestamp 130 is not grouped into an event group 120 and is not shown by the APGE 100 to the user 160. In an alternative embodiment each picture 110 in the set of user's pictures 175 that does not have a timestamp 130 is placed in its own event group 120. In another alternative embodiment every picture 110 in the set of user's pictures 175 that does not have a timestamp 130 is grouped into the same, timeless, event group 125.

In an embodiment the APGE 100 breaks groupings at month boundaries. In this embodiment, even when two compared pictures' timestamps 130 fall within the event time range 150 if the pictures 110 cross a month boundary, e.g., February to January, etc., the APGE 100 will assign the pictures 110 to separate event groups 120.

In an alternative embodiment the APGE 100 does not break groupings on month boundaries. In this alternative embodiment the APGE 100 will group pictures 110 into the same event group 120 as long as they fall within the event time range 150 whether or not they cross a month boundary.

In an embodiment the APGE 100 utilizes the concept of paging and only processes, at a maximum, the amount of user photos 110 that will fit for a grouping display on the user's computing device screen plus an established delta of additional photos 110, i.e., the APGE 100 processes a defined maximum subset of user photos 195 at any one time. In an aspect of this embodiment the APGE 100 processes a maximum subset 195 of one hundred photos 110 at any one time for event 120 grouping. In other aspects of this embodiment the APGE 100 processes a different maximum subset of photos 195 at any one time, e.g., fifty, two hundred, etc.

In an embodiment the APGE 100 can adjust the number of photos 110 in the defined maximum subset of user photos 195 to be processed at any one time based on one or more criteria, including, but not limited to, the screen size where the grouping output from the APGE 100 will be displayed to a user 160, user 160 or other input on the maximum subset 195 size, user 160 input on the size of the photos 110 to be displayed by the APGE 100, etc.

In an embodiment if the number of user's stored photos 175 is less than the defined maximum subset 195 the APGE 100 will process all the user photos 110 at a time.

Because user photos 110 can be added to or deleted from the user's set of photos 175 and/or altered in other respects, in an embodiment the APGE 100 processes user photos 110 on the fly. Thus, in an embodiment the APGE 100 does not store the grouping(s) 120 of user photos 110 from session to session and thus, each time a user 160 invokes the APGE 100 the APGE 100 reprocesses the user's set of photos 195 from the beginning.

In an embodiment the APGE 100 does not store the grouping(s) 120 of user photos 110 that are not currently to be displayed to the user 160. In this embodiment as a user 160 scrolls up or down on the output screen of their display device to view different event groupings 120 of photos 110 the groupings 120 that were previously displayed but are not currently being displayed are not stored by the APGE 100. In this embodiment event groupings 120 that were previously established but are no longer being utilized because they are not currently being displayed are reestablished by the APGE 100 when and if the user 160 scrolls back to the respective pictures' time range, as identified by their timestamps 130.

In an embodiment when the APGE 100 is initially invoked it begins processing with the most current photo 110 and the second most current photo 110, as identified by their respective timestamps 130, in the set of user's photos 175. In an aspect of this embodiment the APGE 100 will jump to another, less recent, photo 110 in the user's set of photos 175 to begin processing anew when the user 160 appropriately scrolls on their device's output screen.

In an alternative embodiment, when the APGE 100 is initially invoked the user 160 can select an alternative start time for processing to begin, e.g., one (1) year earlier than the most current photo 110 in the user's photo set 175, etc.

Figure 3A:
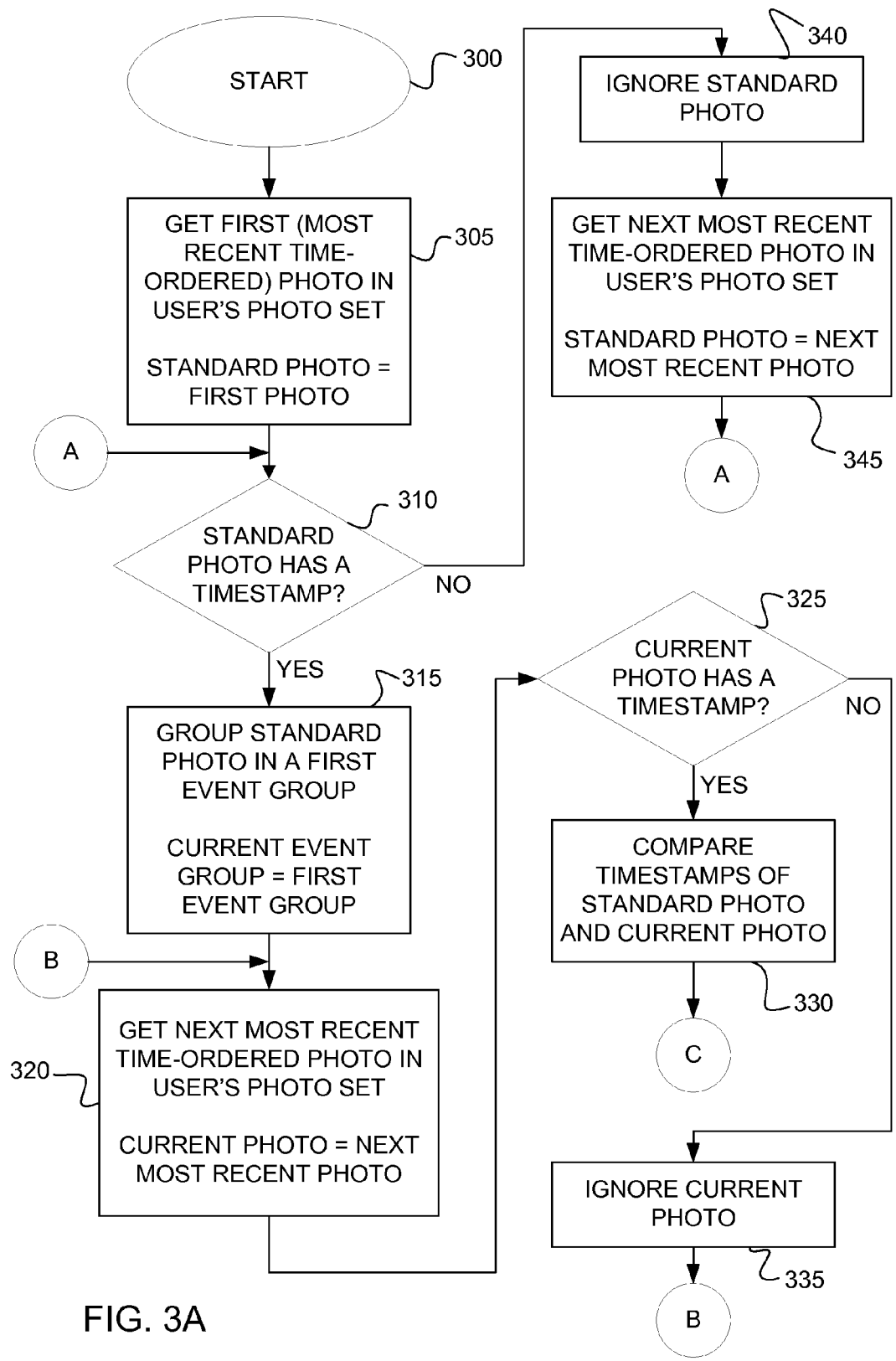
FIGS. 3A-3B depict an embodiment logic flow for automatic photo grouping utilizing photo timestamps as the criteria for grouping.
Figure 3B:
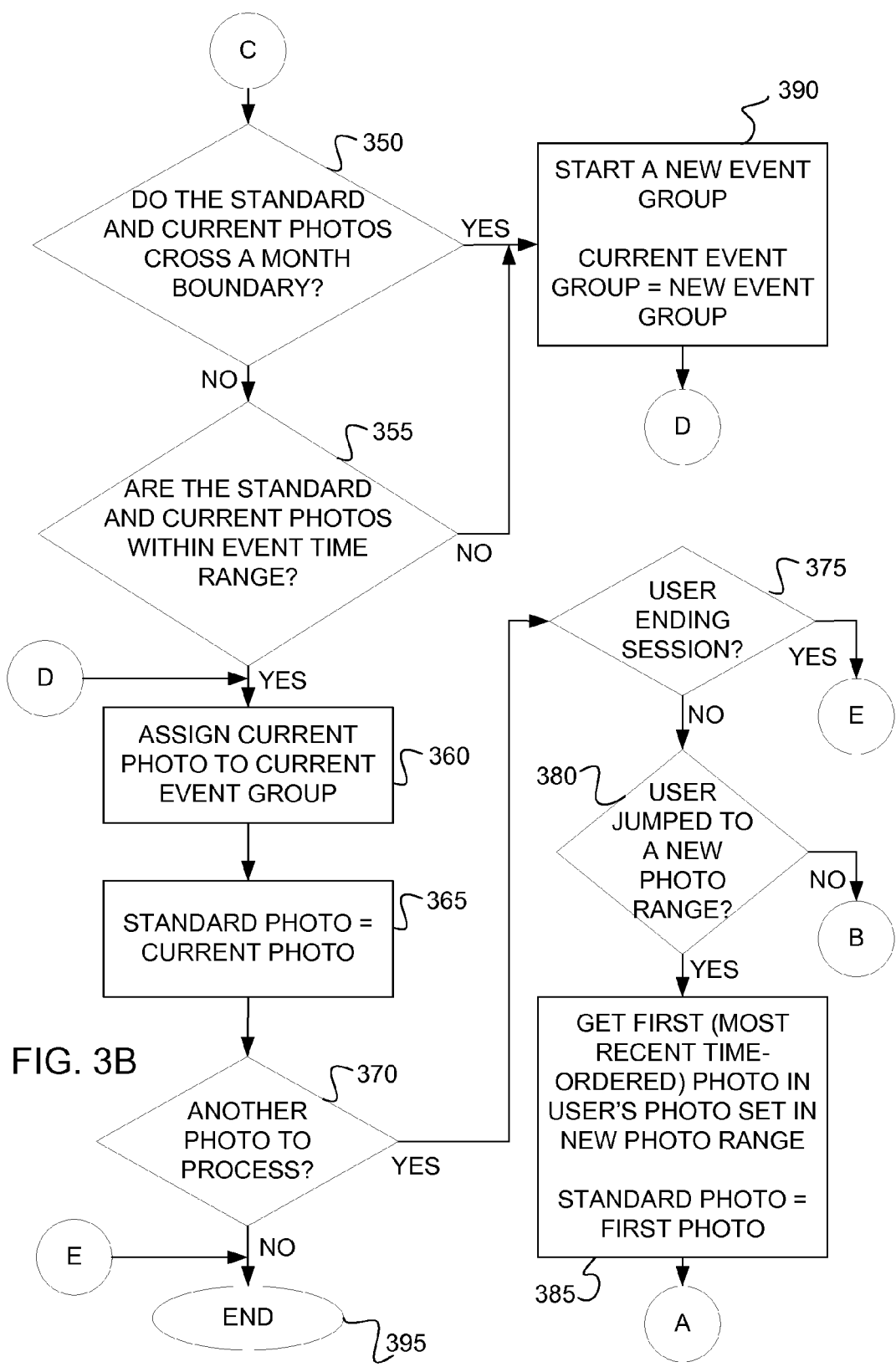

FIGS. 3A-3B illustrate an embodiment logic flow for the embodiment APGE 100 of FIG. 1. In the embodiment logic flow of FIGS. 3A-3B automatic photo grouping is accomplished utilizing photo timestamps 130 as the criteria 170 for grouping.

While the following discussion is made with respect to systems portrayed herein the operations described may be implemented in other systems. The operations described herein are not limited to the order shown. Additionally, in other alternative embodiments more or fewer operations may be performed.

Referring to FIG. 3A automatic photo grouping starts 300, or is otherwise initiated. In an aspect of this embodiment automatic photo grouping starts 300 at the directive, or command, of a user 160, e.g., when the user 160 first initiates automatic photo grouping, when the user 160 changes their screen view to select a new grouping of photos 110 to be displayed, etc. In an aspect of this embodiment automatic photo grouping starts 300 when a program that instigates automatic photo grouping is activated to run by, e.g., a user 160, by the computing system hosting the automatic photo grouping methodology, at a predefined time, etc.

In the embodiment depicted in FIGS. 3A-3B it is assumed that the set of user's photos 175 have already been ordered from most recently taken to least recently taken. For purposes of this document the ordering of the photos 110 can be assumed to be part of the start step 300.

In an embodiment the first, most recent time-ordered, photo in a user's photo set is gotten, or otherwise identified, 305. For purposes of explanation, this first photo is initially identified as the standard photo 305. Standard is just a title used herein to denote a particular photo 110 and is not to be used in any limiting manner here or in the accompanying claims. In this embodiment the timestamp 130 of the standard photo 110 is compared with the timestamp 130 of another photo 110 in the user's photo set 175 to determine if the photos 110 should be grouped 120.

In an embodiment at decision block 310 a determination is made as to whether the standard photo has an associated timestamp. In this embodiment it is assumed that photos 110 without timestamps 130 may be interspersed with photos 110 with timestamps 130 when the photos 110 were previously ordered from most recent to least recently taken 300.

If at decision block 310 the standard photo is found not to have an associated timestamp then in an embodiment the standard photo is ignored, or otherwise not processed, 340. In an alternative embodiment, when the standard photo does not have a timestamp the standard photo is grouped into its own individual group 340. In another alternative embodiment, when the standard photo does not have a timestamp it is grouped into a timeless group with any other photos in the user's photo set that are identified as not having a timestamp 340.

In an embodiment the next most recent time-ordered photo in the user's photo set is gotten, or otherwise identified, 345. For purposes of explanation this newly gotten photo is initially identified as the standard photo 345. Again, in an embodiment at decision block 310 a determination is made as to whether the standard photo has an associated timestamp.

If at decision block 310 it is found that the standard photo has a timestamp then in an embodiment the standard photo is grouped into a first event group 315. In an embodiment this first event group is initially identified as the current event group 315. In this embodiment the current event group is the group that associated photos are to be currently assigned to, or otherwise placed in. First and current are just titles used herein to denote a particular event group and are not to be used in any limiting manner here or in the accompanying claims.

In an embodiment the next most recent time-ordered photo in the user's photo set is gotten or otherwise identified 320. In this embodiment, photos 110 from the user's photo set 195 are being retrieved from most recently taken to least recently taken.

In an embodiment this next most recent time-ordered photo is initially identified as the current photo 320. Current is just a title used herein to denote a particular photo being processed by an embodiment APGE 100 and is not to be used in any limiting manner here or in the accompanying claims. In this embodiment the timestamp 130 of the current photo 110 is compared to the timestamp 130 of the standard photo 110 to determine if the current photo 110 and standard photo 110 should be assigned to the same event group 120.

In an embodiment at decision block 325 a determination is made as to whether the current photo has an associated timestamp. As previously mentioned, in this embodiment it is assumed that photos 110 without timestamps 130 may be interspersed with photos 110 with timestamps 130.

If at decision block 325 the current photo is found not to have a timestamp then in an embodiment the current photo is ignored, or otherwise not processed, 335. In an alternative embodiment, when the current photo does not have a timestamp it is grouped into its own individual group 335. In another alternative embodiment, when the current photo does not have a timestamp it is grouped into a timeless group with any other photos in the user's photo set that are identified as not having an accompanying timestamp 335.

In an embodiment the next most recent time-ordered photo in the user's photo set is gotten or otherwise identified 320.

If, however, at decision block 325 it is found that the current photo has a timestamp then in an embodiment the timestamps of the current and standard photos are compared 330.

Referring to FIG. 3B, in an embodiment at decision block 350 a determination is made as to whether the current and standard photos cross a month boundary.

If the current and standard photos do cross a month boundary in an embodiment a new event group is started, initiated, or otherwise identified, 390. In an embodiment this new event group is now identified as the current event group 390. In an embodiment the current photo is assigned to, or otherwise identified with, the newly identified current event group 360.

If at decision block 350 it is determined that the current and standard photos do not cross a month boundary then in an embodiment at decision block 355 a determination is made as to whether the standard and current photos are within the event time range; i.e., whether the timestamps for the current and standard photos indicate that they were taken within the predefined event time range of each other.

If no, in an embodiment the current photo is determined to be from a different event than the standard photo as it is decided that the photos are too far apart in time to be from the same event. In an embodiment and this event a new event group is started, initiated, or otherwise identified 390. In an embodiment this new event group is now identified as the current event group 390. In an embodiment the current photo is assigned to, or otherwise identified with, the newly identified current event group 360.

If at decision block 355 it is found that the standard and current photos are within the event time range then in an embodiment the current photo is determined to be from the same event as the standard photo as it is decided that they are close enough in time to assume they depict the same event. In an embodiment and this eventuality the current photo is assigned to, or otherwise identified with, the current event group, which includes the standard photo, 360.

In an embodiment the current photo is now identified as the standard photo 365.

In an alternative embodiment the check for photos crossing a month boundary is not performed 350, and a determination 355 is simply made as to whether the standard and current photos are within the event time range. If they are, in an embodiment they will be assigned to the same event group 120, pursuant to step 360. If they are not, in an embodiment they will be associated with different event groups 120, pursuant to steps 390 and 360.

In an embodiment at decision block 370 a determination is made as to whether there is another photo to process. In an aspect of this embodiment a determination is made as to whether there is another photo 110 to be processed in the maximum subset of photos 195 to be currently processed. In an alternative aspect of this embodiment a determination is made as to whether there is another photo 110 to be processed in the set of user's photos 175.

If there is currently no additional photo to be processed, processing ends 395.

If at decision block 370 there is at least one more photo to be processed then in an embodiment at decision block 375 a determination is made as to whether the user is terminating the automatic grouping session. If yes, in an embodiment processing ends 395.

If at decision block 375 the user is not ending the automatic photo grouping session then in an embodiment at decision block 380 a determination is made as to whether the user has jumped, or changed, i.e., scrolled, to a new photo time range within their set of user's photos. If no, and referring back to FIG. 3A, in an embodiment the next photo in the user's photo set is gotten, or otherwise identified, 320 and processing continues as previously described.

If at decision block 380 of FIG. 3B the user has changed photo time ranges, then in an embodiment the most recent time-ordered photo in the user's photo set in the new photo time range is gotten, or otherwise identified, 385. In an embodiment this new most recent time-ordered photo is identified as the standard photo 385. In an embodiment, and referring again to FIG. 3A, at decision block 310 a determination is made as to whether the standard photo has an accompanying timestamp and processing continues as previously described with this new time range of user's photos.

Figure 4:
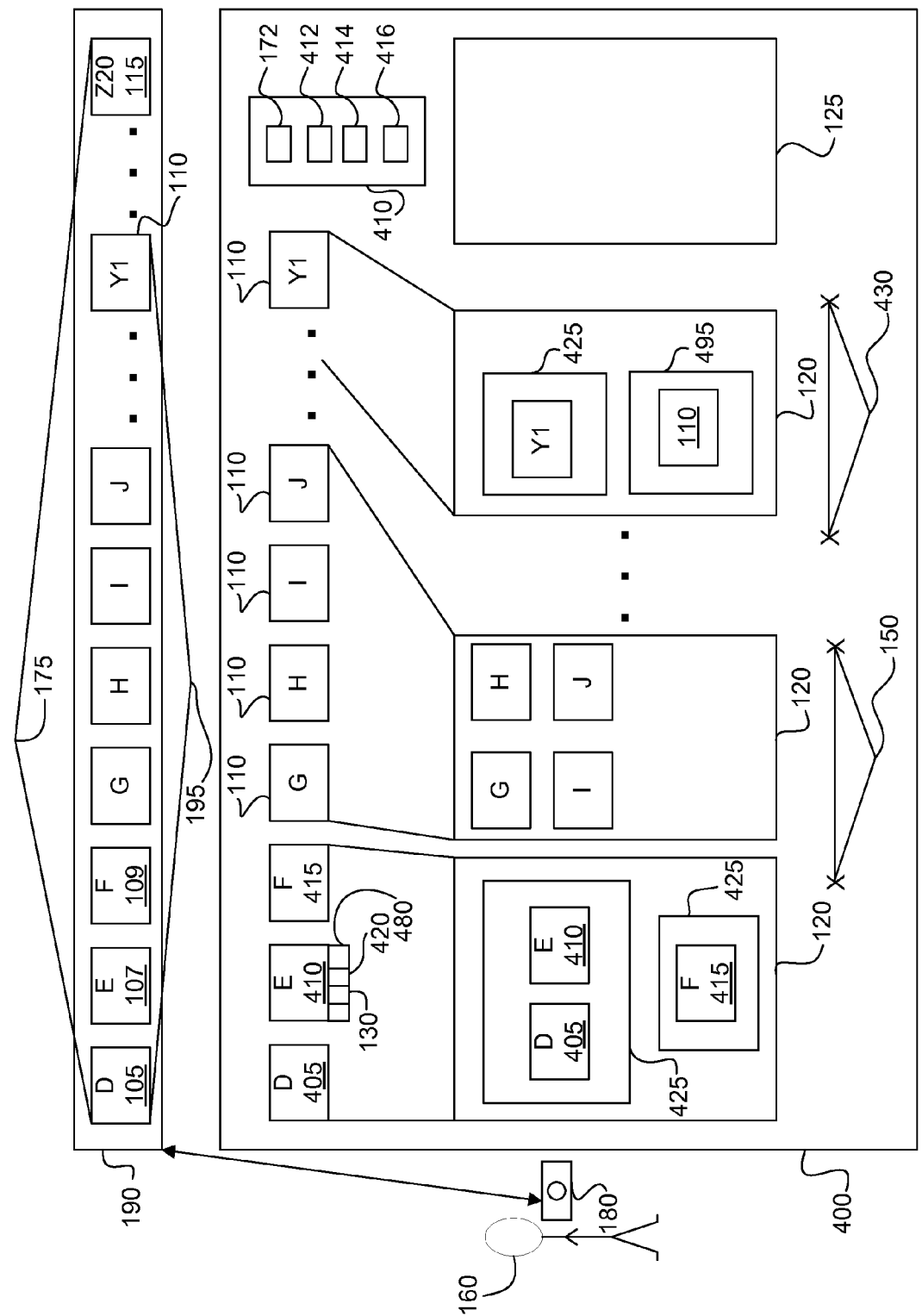
FIG. 4 depicts an embodiment enhanced automatic photo grouping environment (enhanced APGE).

In a second, enhanced, embodiment automatic photo grouping environment 400, shown in FIG. 4, also referred to herein as the enhanced APGE 400, a user's pictures 110 are analyzed and grouped into one or more events 120, or event groups 120, utilizing one or more of a collection, or set, of photo criteria 410. In an embodiment the enhanced APGE 400 strives to provide additional refinement, or alternative grouping strategies, to its grouping determinations.

In both the APGE 100 of FIG. 1 and the enhanced APGE 400 of FIG. 4 a set of user's photos 175 are analyzed and grouped into one or more event groups 120. The difference between the APGE 100 and the enhanced APGE 400 is the photo criteria 410 and manner of utilizing the photo criteria 410 employed to define the event groups 120.

In an embodiment one photo criteria 410 that the enhanced APGE 400 employs to automatically group user's photos 110 with is time 172 as is done in the APGE 100 of FIG. 1. In an embodiment a second photo criteria 410 that the enhanced APGE 400 employs to automatically group user's photos 110 with is the location of the subject of a photo, also referred to herein as the GPS, 412. In an embodiment a third photo criteria 410 that the enhanced APGE 400 employs is a photo's name 414. In an embodiment a fourth photo criteria 410 that the enhanced APGE 400 employs is the photos' storage folders 416.

In alternative embodiments more, less and/or different photo criteria 410 can be employed to automatically group user's photos 110; e.g., tags associated with a user's photos 110, pixel density of the user's photos 110, the identity of person(s) depicted in user's photos 110, landmarks and/or objects depicted in user's photos 110, etc. In alternative embodiments the ordering of the photo criteria 410 employed to group user's photos 110 can be different than is described herein in embodiment(s). For example, in an alternative embodiment GPS criteria 412 can be used to first group a set of user's photos that have GPS information 420 and then the photos' names 414 can be further utilized to either refine and/or augment the initial grouping.

In an embodiment enhanced APGE 400 a set of user's pictures 175 stored on a camera 180 and/or in storage 190 are initially ordered from most recently taken to the earliest one taken, based on each picture's accompanying timestamp 130. Thereafter, in the embodiment the enhanced APGE 400 first uses the time criteria 172 to automatically group user's photos 110. In an embodiment the APGE 400 analyzes two concurrent photos 110 and utilizes their respective timestamps 130, if they each have one, to make an initial determination as to whether the two pictures 110 are from the same event 120 and should therefore be grouped together.

In an embodiment two photos 110 are initially determined to belong to the same event 120 by the enhanced APGE 400 if they are within a predefined event time range 150 of each other. In an embodiment two photos 110 are determined to not belong to the same event 120 by the enhanced APGE 400 if they are found to be without the event time range 150. In an embodiment two photos 110 are determined to not belong to the same event by the enhanced APGE 400 if one of them lacks an associated timestamp 130.

In an embodiment two photos 110 are initially grouped together by the enhanced APGE 400 if their respective timestamps 130 are within four (4) hours of each other. In other aspects of this embodiment two photos 110 are initially grouped together by the enhanced APGE 400 if their respective timestamps are within other identified time ranges of each other, e.g., two (2) hours, six (6) hours, etc.

In an embodiment the event time range 150 can be programmed by a user 160. In an embodiment a predetermined event time range 150 can be altered by a user 160.

In an embodiment the event time range 150 is the same for each event grouping of photos 110. In other words, the photos 110 that are initially assigned to a first event group 120 by an embodiment APGE 400 is determined by the same event time range 150 as the photos 110 that are initially assigned to a second event group 120, and so on.

In an embodiment, once it is initially determined that two photos 110 are to be grouped together based on the time criteria 172 the enhanced APGE 400 checks whether each of these pictures 110 has location, i.e., GPS, information 420 associated with them.

In an embodiment, if both the photos 110 have associated GPS information 420 the enhanced APGE 400 utilizes a distance per time concept to determine if the photos 110 were taken within a predefined event geographic range 430, and thus, can be assumed to depict the same event 120. In this manner the event geographic range 430 concept allows for users 160 moving around over time while capturing pictures 110 of the same event 120. In an embodiment the event geographic range 430 is a maximum distance over time that the subject of two photos 110 can be from each other and still be determined to represent the same event 120.

In an embodiment the enhanced APGE 400 deems that two time consecutive photos 110 that are within the event time range 150 belong to the same event 120 if they are also within a defined event geographic range 430 of each other. In an aspect of this embodiment two photos 110 that are already determined to be within the event time range 150 are automatically grouped together by the enhanced APGE 400 if their GPS information 420 indicates that the pictures 110 were taken within ten (10) feet per minute of each other. As an example, in this embodiment if two (2) time consecutive pictures 110 are taken two (2) minutes apart, using a ten (10) feet per minute event geographic range 430 the pictures 110 will have to have been taken within twenty (20) feet of each other (10 feet×2 min), as identified by their respective GPS information 420, for the enhanced APGE 400 to group them together.

In other aspects of this embodiment two photos 110 that are already determined to be within the event time range 150 are automatically grouped together by the enhanced APGE 400 if their GPS information 420 indicates that the pictures 110 were taken within other identified distance per time ranges, i.e., defined event geographic ranges 430, of each other, e.g., six (6) feet per minute, ten (10) yards per minute, one (1) mile per thirty (30) minutes, etc.

In an embodiment the event geographic range 430 can be programmed by a user 160. In an embodiment a predetermined event geographic range 430 can be altered by a user 160.

In an embodiment the event geographic range 430 is the same for each event grouping of photos 110. In other words, the photos 110 that are assigned to a first event subgroup 425 are related by the same event geographic range 430 as the photos 110 assigned to a second event subgroup 425, and so on.

It will be noted that in this embodiment while the event geographic range 430 used to determine if any two pictures 110 should be grouped together remains the same its start and end locations change based on the GPS information 420 of the immediately prior picture 110 that was analyzed and grouped by the enhanced APGE 400. Thus, in this embodiment picture 109 can be grouped with picture 105 even though the GPS information 420 for pictures 105 and 109 are not within the event geographic range 430, as long as picture 105 is grouped with picture 107 and thereafter picture 107 is grouped with picture 109.

In an embodiment, if two photos 110 being analyzed by the enhanced APGE 400 are within the event time range 150 and event geographic range 430 of each other than the enhanced APGE 400 assigns these two photos 110 to the same event subgroup 425. In an embodiment an event subgroup 425 is a collection of one or more photos 110 that are within the event time range 150 and the event geographic range 430 of each other as previously described. In an embodiment an event subgroup 425 is a collection of one or more user photos 110 that have been determined to represent the same event.

In an embodiment if two photos 110 being analyzed by the enhanced APGE 400 are within the event time range 150 but not the event geographic range of each other than the enhanced APGE 400 assigns the second, least recent of the two, photos 110 to a new event subgroup 425 within the same event group 120.

In an embodiment if two photos 110 being analyzed by the enhanced APGE 400 are not within the event time range 150 the enhanced APGE 400 will assign the second, least recent of the two, photos 110 to a new event group 120. In this embodiment and situation these two photos 110 will not be analyzed by the embodiment APGE 400 to determine if they are within the event geographic range 430 of each other and they will not have the opportunity to be within any same event subgroup 425.

Figure 5A:
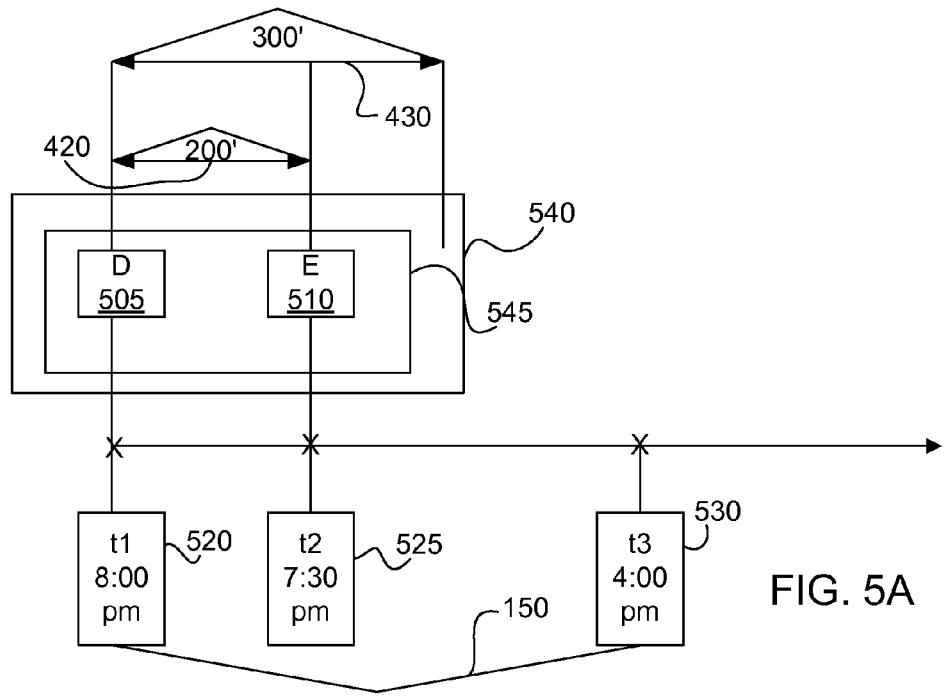
FIGS. 5A-5B depict exemplary automatic photo groupings utilizing the enhanced APGE of FIG. 4 where photo timestamps and photo GPS are the criteria for grouping.

FIG. 5A depicts an example of two photos 110, Picture D 505 and Picture E 510, that are within the event time range 150 of each other and the event geographic range 430 of each other. For this example assume that the event time range 150 is four (4) hours, Picture D 505 was taken at time t1 520 and Picture E 510 was taken one-half hour earlier at time t2 525. Also assume for this example that the event geographic range 430 is ten (10) feet per minute and that Picture E 510 was taken two hundred (200) feet from Picture D 505.

In determining whether the first 505 and second 510 pictures should be grouped in an embodiment and this example the enhanced APGE 400 uses the event time range 150 of four (4) hours with a start time t1 520, i.e., the timestamp 130 of the first picture 505 being analyzed, and an end time t3 530 of four hours earlier, as the pictures 505 and 510 are initially ordered from most recent to least recent. In this example, as Picture E 510 was taken only half an hour earlier than Picture D 505 in an embodiment the enhanced APGE 400 groups Picture D 505 and Picture E 510 into a same first event group 540.

In an embodiment and this example the enhanced APGE 400 checks to see if the pictures 505 and 510 have GPS information 420, which they do. In an embodiment and this example the enhanced APGE 400 uses the event geographic range 430 of ten (10) feet per minute to determine if Picture D 505 and Picture E 510 should be grouped within the same event subgroup 425. In this example, given that the pictures 505 and 510 were taken thirty (30) minutes apart, they can be from zero (0) to three hundred (300) feet apart, and be within the event geographic range 430 of each other (10 feet/minute×30 minutes=300 feet). In the example, as the pictures 505 and 510 were taken two hundred (200) feet apart, i.e., their photo location range is two hundred feet, they are within the event geographic range 430 of each other. Thus, in an embodiment and this example the enhanced APGE 400 determines that Picture D 505 and Picture E 510 are of the same event and groups them within the same event subgroup 545 of the event group 540.

In an alternative embodiment and utilizing the example of FIG. 5A the enhanced APGE 400, upon first determining that Picture D 505 and Picture E 510 are within the event time range 150 of each other initially assigns them to a first event group 540. Thereafter, upon determining that Picture D 505 and Picture E 510 are also within the event geographic range 430 of each other in this alternative embodiment the enhanced APGE 400 confirms and finalizes the assignment of both pictures to the same event group 540. In this alternative embodiment subgroups 425 are not utilized.

Figure 5B:
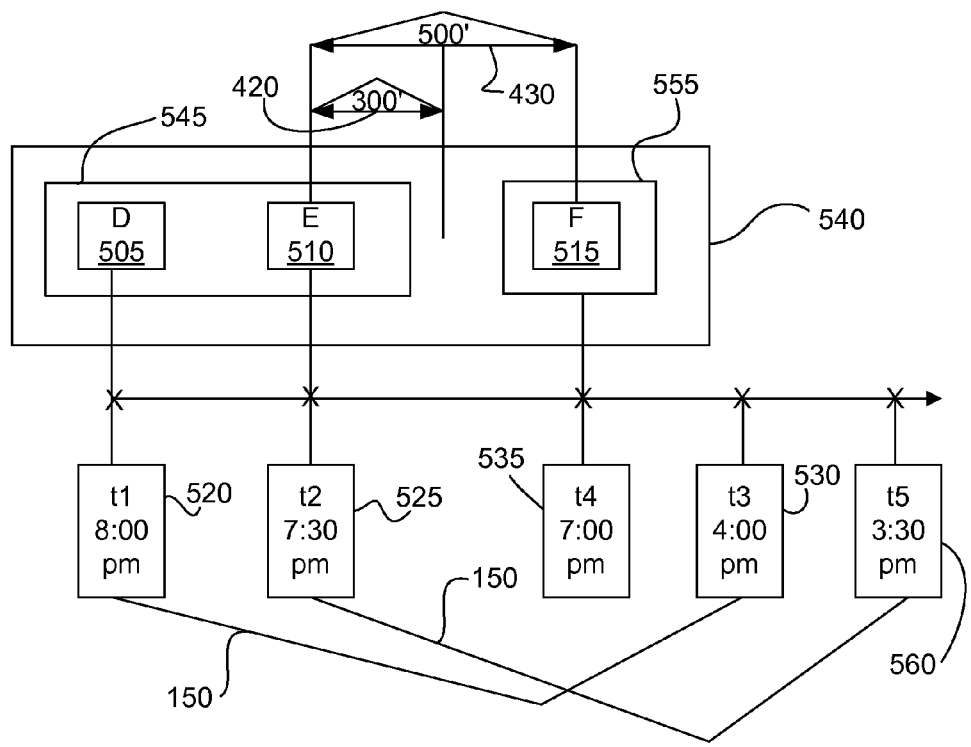

FIG. 5B depicts the example of Picture D 505 and Picture E 510 of FIG. 5A and an additional, third, Picture F 515. As was determined with reference to FIG. 5A, Picture D 505 and Picture E 510 have been grouped by the embodiment enhanced APGE 400 into the same event subgroup 545. In the example of FIG. 5B Picture F 515 was taken thirty (30) minutes earlier than Picture E 510, at t 4 535. In this example Picture F 515 was taken five hundred (500) feet from Picture E 510, i.e., their photo location range is five hundred feet.

In determining whether Picture F 515 should be grouped with Picture D 505 and Picture E 510 in an embodiment and this example the enhanced APGE 400 uses the event time range 150 of four (4) hours with a start time t2 525, i.e., the timestamp 130 of the second picture 510, now being analyzed with the third picture 515, and an end time t5 560 of four hours earlier. In this example, as Picture F 515 was taken only half an hour earlier than Picture E 510 the enhanced APGE 400 groups Picture F 515 with Picture E 510 into a same first event group 540.

In an embodiment and this example the enhanced APGE 400 then checks to see if the pictures 510 and 515 have GPS information 420, which they do. In an embodiment and this example the enhanced APGE 400 uses the event geographic range 430 of ten (10) feet per minute to determine if Picture E 510 and Picture F 515 should be grouped within the same first event subgroup 545. In this example, given that the pictures 510 and 515 were taken thirty (30) minutes apart, they can be from zero (0) to three hundred (300) feet apart and be within the event geographic range 430 of each other (10 feet/minute×30 minutes=300 feet). In this example, however, as the pictures 510 and 515 were taken five hundred (500) feet apart they are not within the event geographic range 430 of each other. Thus, in an embodiment and this example the enhanced APGE 400 determines that Picture D 505 and Picture E 510 are not of the same event and initiates a new event subgroup 555 within the event group 540, assigning Picture F 515 to this new, second, event subgroup 555.

The scenario of the example depicted in FIG. 5B can occur, for instance, when a user 160 uploads pictures 110 captured by their camera 180 and pictures 110 taken by someone else on a different camera 180 in the same time frame but at different locations for different events.

In an alternative embodiment and utilizing the example of FIG. 5B the enhanced APGE 400, upon first determining that Picture E 510 and Picture F 515 are within the event time range 150 of each other initially assigns Picture F 515 with Picture E 510 to the first event group 540. Thereafter, however, upon determining that Picture E 510 and Picture F 515 are not within the event geographic range 430 of each other in this alternative embodiment the enhanced APGE 400 reassigns Picture F 515 to a new, second, event group 120 and finalizes this reassignment. In this alternative embodiment subgroups 425 are not utilized.

In an embodiment if a picture 110 could belong to at least two different subgroups 425 based on the picture's timestamp 130 and its GPS information 420 then the enhanced APGE 400 will assign this subject picture 110 to the event subgroup 425 containing a photo 110 that was taken closest in time to the subject picture 110.

In an alternative embodiment if a picture 110 could belong to at least two different subgroups 425 based on the picture's timestamp 130 and its GPS information 420 then the enhanced APGE 400 will assign this subject picture 110 to the subgroup 425 containing a photo 110 that was taken closest in distance to the subject picture 110.

There can be situations where some user's photos 110 have GPS information 420 and some do not, e.g., GPS may not have been available when a subset of user's photos 110 were captured. In an embodiment if all the user's photos 110 that have GPS information 420 and are within an event time range 150 are also within the event geographic range 430, and thus grouped into the same event subgroup 425, then the enhanced APGE 400 will group those user's photos 110 that are also within the event time range 150 but have no GPS information 420 into the same event subgroup 425. In this embodiment the enhanced APGE 400 uses the assumption that all photos 110 that are within an event time range 150 that include a subset of photos 110 with GPS information 420 that are within the event geographic range 430 depict the same event.

Figure 6:
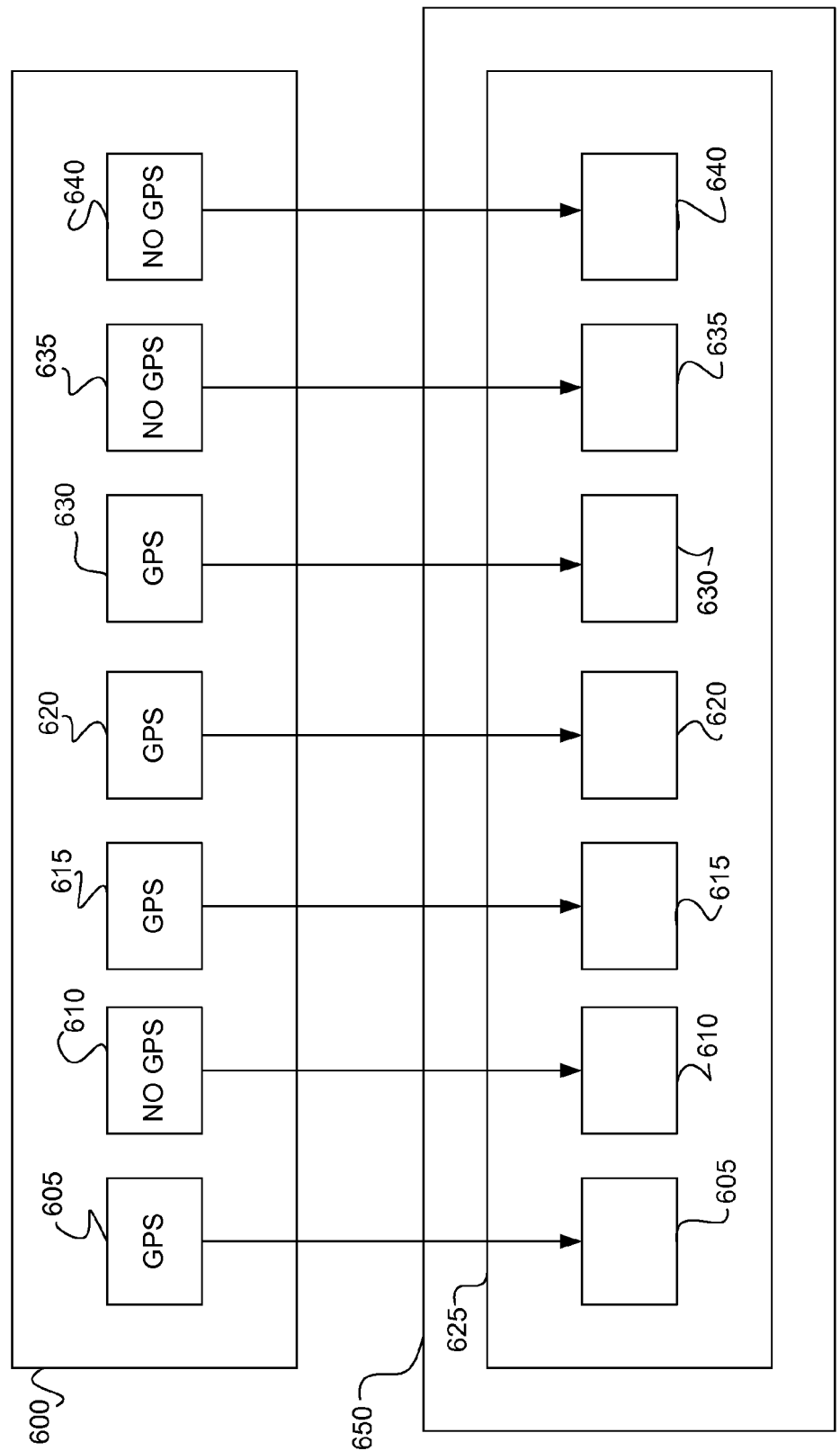
FIG. 6 depicts exemplary automatic photo groupings utilizing the enhanced APGE of FIG. 4 when some photos in an event group have GPS and others do not.

For example, and referring to FIG. 6, assume that a subset of user's photos 600 were all taken within one (1) hour of each other and the event time range 150 is three (3) hours. In an embodiment and this example the enhanced APGE 400 groups all the subset of user's photos 600 into a first event group 650. For the example of FIG. 6 photos 605, 615, 620 and 630 have GPS information 420 that indicates that all these photos 110 were taken within ten (10) feet of each other. Assuming for the example of FIG. 6 that the event geographic range 430 is three hundred (300) feet, in an embodiment the enhanced APGE 400 will group photos 605, 615, 620 and 630 into the same event subgroup 625.

In the example of FIG. 6 photos 610, 635 and 640 do not have GPS information 420. In an embodiment and this example, however, because photos 610, 635 and 640 are within the event time range 150 for event group 650 and all other photos 110 in the subset of user's photos 600 that are grouped in this same event group 650 have GPS information 420 that determines that they are within the event geographic range 430 of each other, the enhanced APGE 400 will group photos 610, 635 and 640 in the same event subgroup 625.

In alternate embodiments the enhanced APGE 400 groups user's photos 110 in the event time range 150 and with GPS information 420 in a separate event subgroup 425 than user's photos 110 that are in the event time range 150 but have no GPS information 420; e.g., those photos 110 without GPS information 420 are all grouped into a second event subgroup 425, those photos 110 without GPS information 420 are each grouped into their own individual event subgroup 425, etc.

There can be situations where some user's photos 110 have GPS information 420 and some do not but based on the available GPS information 420 the user's photos 110 with GPS information 420 are assigned by the enhanced APGE 400 to two or more event subgroups 425. In this instance it is deemed likely that the user's photos 110 depict two or more events. In this situation and an embodiment the enhanced APGE 400 employs the use of a third criteria, photos' names, 414 to attempt to automatically group all the user's photos 110 into meaningful event groups 120 and subgroups 425.

In an embodiment stored user's photos 175 each have a name 480 associated with them, also referred to herein as a photo name 480. In embodiments a name 480 is supplied by the camera 180 that captured the photo 110. In embodiments a name 480 can be assigned to a photo 110 by a user 160.

In an embodiment if a photo name 480 is supplied by the camera 180 that captured it the name 480 includes numbers and/or letters. In an embodiment the letters of a photo name 480 that is supplied by a camera 180 identify the camera 180, e.g., manufacturer and/or model and/or camera type 180, i.e., camera, cellphone, etc., etc.

In an embodiment if a subject photo 110, i.e., a photo 110 currently being analyzed by the enhanced APGE 400 for automatic event grouping purposes, has no GPS information 420 but does have a timestamp 130 that places it within the event time range 150 for an event group 120 of user photos 110 with two or more event subgroups 425 the enhanced APGE 400 will automatically group the subject photo 110 into the event subgroup 425 of the event group 120 with photos 110 whose names 480 are similar and/or close enough to the name 480 of the subject photo 110. In this embodiment and situation the enhanced APGE 400 employs the assumption that photos 110 taken close in time 130 and with similar names 480 are of the same event.

In an aspect of this embodiment the criteria 414 for the enhanced APGE 400 to determine that a subject photo 110 has a similar or close enough name 480 to another photo 110, also referred to herein as similar name 414, is that the photo names 480 have identical letters and their numbers are within a predefined range of each other, e.g., ten (10), fifty (50), etc.

For example, assume that in a first event subgroup 425 of a first event group 120 there are three photos 110 named DSC__3430, DSC__3431 and DSC__3432. Also assume that in a second event subgroup 425 of the same first event group 120 there are two photos 110 named IMG__5555 and IMG__5557. In this example an embodiment enhanced APGE 400 is attempting to group a sixth photo 110, named DSC__3436, with a timestamp 130 that places it within the first event group 120 but without any GPS information 420. For this example the similar name criteria 414 requires similar photo names 480 to have the same letters and be within ten (10) numbers of each other. Using this similar name criteria 414, as the sixth photo has the same letters (DSC) as the photos 110 in the first event subgroup 425 and its number (3436) is within ten of any of the numbers of the these photos 110 in an embodiment the enhanced APGE 400 groups the sixth photo into the first event subgroup 425.

As a second example assume the first and second event subgroups 425 as described with reference to the previous example. In this second example an embodiment enhanced APGE 400 is attempting to group a sixth photo 110, named DSC__3602, with a timestamp 130 that places it within the first event group 120 but without any GPS information 420. Assume for this example that the similar name criteria 414 requires similar photo names 480 to have the same letters and be within ten (10) numbers of each other. Using this similar name criteria 414, the embodiment enhanced APGE 400 will not assign the sixth photo 110 to the first event subgroup 425 as while the letters of the sixth photo 110 (DSC) match the letters of the three photos 110 in the first event subgroup 425 the sixth photo's number is not within ten of any number of the photos 110 in the first event subgroup 425. In this second example the embodiment enhanced APGE 400 will not assign the sixth photo 110 to the second event subgroup 425 either as the letters of the sixth photo 110 (DSC) do not match the letters (IMG) of either of the photos 110 in the second event subgroup 425. In this second example and an embodiment the enhanced APGE 400 will assign the sixth photo 110 to an event subgroup 495 for photos 110 within an event group 120 that have no GPS information 420 and cannot be assigned to any other event subgroup 425 of the event group 120 based on their photo name 480.

In an alternative aspect of this embodiment the criteria 414 for the enhanced APGE 400 to determine that a subject photo 110 has a similar photo name 480 to another photo 110 is that the photo names 480 have identical letters. In this alternative aspect embodiment and referring back to the prior second example the enhanced APGE 400 would group the sixth photo 110 within the first event subgroup 425 as the sixth photo 110 has the same name letters (DSC) as the three photos 110 assigned to the first event subgroup 425.

In a second alternative aspect of this embodiment the criteria 414 for the enhanced APGE 400 to determine that a subject photo 110 has a similar photo name 480 to another photo 110 is that the photo names 480 have numbers within a predefined range of each other, e.g., ten (10), fifty (50), etc. In other alternative aspects other criteria 414 can be employed by the enhanced APGE 400 to determine whether two photos 110 have similar photo names 480 to warrant grouping them into the same event subgroup 425.

In an embodiment the enhanced APGE 400 compares a subject photo name 480 with the photo names 480 of all the photos 110 in an event subgroup 425 to determine if the subject photo 110 has a similar photo name 480 to any of the event subgroup's photos 110 and should, therefore, be grouped with them. In an alternative embodiment the enhanced APGE 400 compares a subject photo name 480 with the photo name 480 of the last, least recent, photo 110 in an event subgroup 425 to determine if the subject photo 110 has a similar photo name 480 and should, therefore, be grouped within the event subgroup 425.

In an embodiment if a subject photo 110 with no GPS information 420 that has a timestamp 130 that groups it within an event group 120 with two or more event subgroups 425 has a photo name 480 that is not found to be similar to any photo 110 in any of the event subgroups 425 the enhanced APGE 400 will group the subject photo 110 into an event subgroup 495 of the event group 120 for all such subject photos 110. In other words, in this embodiment all photos 110 that are within an event group 120 based on their timestamp 130 but cannot be assigned to any event subgroup 425 of the event group 120 because they lack GPS information 420 and their photo names 480 are dissimilar to the photo names 480 of the photos 110 assigned to the existing event subgroups 425 are assigned by the enhanced APGE 400 to the same event subgroup 495. In this embodiment there is one event subgroup 495 for all photos 110 within an event group 120 that have no GPS information 420 and whose photo names 480 are dissimilar to the photo names 480 of the other photos 110 within the event group 120.

In an alternate embodiment if a subject photo 110 with no GPS information 420 that has a timestamp 130 that groups it within an event group 120 with two or more event subgroups 425 has a photo name 480 that is not similar to any photo 110 in any of the event subgroups 425 the enhanced APGE 400 will group the subject photo 110 into its own individual event subgroup 495. In other words, in this alternate embodiment each photo 110 that is within an event group 120 based on its timestamp 130 but cannot be assigned within any event subgroup 425 of the event group 120 because it lacks GPS information 420 and its photo name 480 is dissimilar to the photo names 480 of the photos 110 assigned to the existing event subgroups 425 is assigned by the enhanced APGE 400 to its own individual event subgroup 495. In this alternative embodiment there can be many event subgroups 495—one for each photo 110 within an event group 120 that has no GPS information 420 and whose photo name 480 is dissimilar to the photo names 480 of the other photos 110 within the event group 120.

In an embodiment the enhanced APGE 400 uses the similar name criteria 414 for photos 110 with no GPS information 120 that are within an event group 120 of two or more event subgroups 425 after the enhanced APGE 400 has grouped all the photos 110 in the event group 120 with GPS information 420 into event subgroup(s) 425, and thus, all the event subgroups 425 for the event group 120, based on GPS information 420, have been generated, or otherwise defined.

In an embodiment the enhanced APGE 400 will use a fourth, folder, criteria 416 to attempt to automatically group a user's photo 110 with no GPS information 420 and a dissimilar name 480 into an event group 120 with two or more event subgroups 425. In this embodiment the enhanced APGE 400 employs the assumption that a subject photo 110 with no GPS information 420 can be automatically grouped with other photos 110 assigned to an event subgroup 425 if the subject photo 110 is stored within a same folder in storage 190 as the other photos 110 in the event subgroup 425. In this embodiment it is assumed that a user 160 assigned two or more photos 110 to a same folder in the user's photo folder hierarchy because the user 160 wanted them to be grouped together.

In an embodiment the enhanced APGE 400 using the folder criteria 416 will assign a subject photo 110 with no GPS information 420 to an existing event subgroup 425 if the subject photo 110 is within the same lowest level folder of the user's photo folder hierarchy as all the photos 110 assigned to the event subgroup 425. In an alternative embodiment the enhanced APGE 400 using the folder criteria 416 will assign a subject photo 110 with no GPS information 420 to an event subgroup 425 if the subject photo 110 is within the same lowest level folder as at least one photo 110 assigned to the event subgroup 425. In other alternative embodiments the enhanced APGE 400 using the folder criteria 416 utilizes other folder sub-criteria for determining whether a subject photo 110 with no GPS information 420 should be assigned to an event subgroup 425; e.g., if the subject photo 110 is within the same lowest level folder as at least half the photos 110 assigned to the event subgroup 425, if the subject photo 110 is within the lowest or second lowest level folder of the user's photo folder hierarchy as all the photos 110 assigned to the event subgroup 425; etc.

Figure 7:
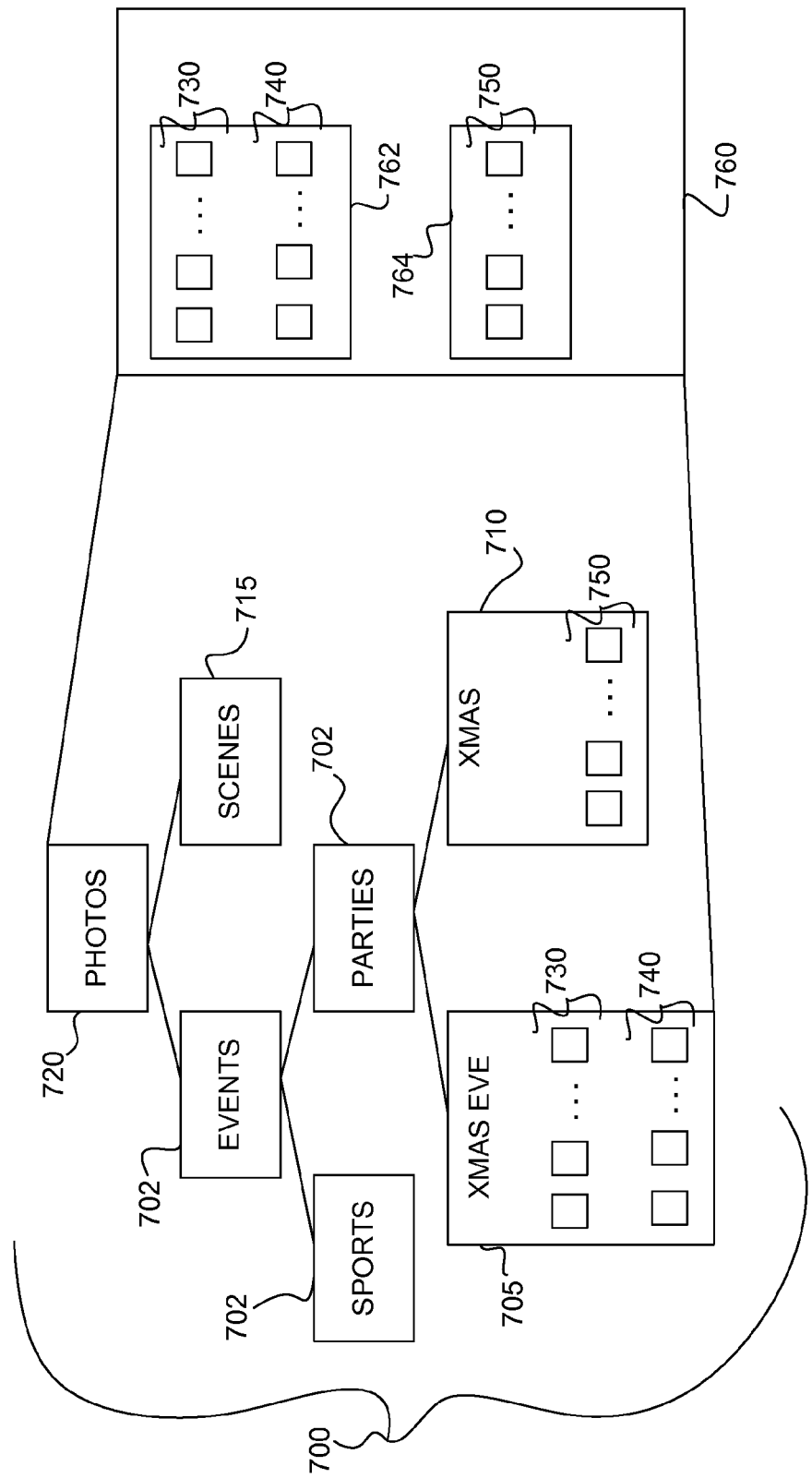
FIG. 7 depicts exemplary automatic photo groupings utilizing the enhanced APGE of FIG. 4 where photo folder placement is a criteria for grouping.

FIG. 7 depicts an example situation where there is a group of at least one user photo 740 with no GPS information 420 that is within an event group 760 of photos 110 but does not have a photo name 480 similar to any of the photos 110 assigned to the two event subgroups 762 and 764 of the event group 760. In the example of FIG. 7 a user 160, Ben, has a photo folder hierarchy 700 of various folders 702 that contain user photos 110. The highest, root, folder 702 in the photo folder hierarchy 700 is the PHOTOS folder 720. The lowest level folders 702 in the photo folder hierarchy 700 are the XMAS EVE folder 705, the XMAS folder 710 and the SCENES folder 715 as none of these folders 702 have subfolders.

In the example of FIG. 7 Ben has uploaded pictures 730 that he took at a Christmas Eve party into the XMAS EVE folder 705 and pictures 750 that he took at a subsequent Christmas party into the XMAS folder 710. Ben's pictures 730 and 750 all have timestamps 170 and GPS information 420. In the example of FIG. 7 the photos 730 and the photos 750 all fall within the event time range 150 and thus in an embodiment the enhanced APGE 400 automatically groups all these photos 730 and 750 into the same event group 760. In the example of FIG. 7 the photos 730 are all within the event geographic range 430 and, in an embodiment, are grouped by the enhanced APGE 400 into a first event subgroup 762. In this example the photos 750 are not within the event geographic range 430 as defined by the photos 730 but are all within an event geographic range 430 defined by themselves, and thus, in an embodiment, are grouped by the enhanced APGE 400 into a second event group 764.

In this example Ben has also uploaded Ron's pictures 740 that Ron took at the same Christmas Eve event as Ben's photos 730 into the same XMAS EVE folder 705. In this example and an embodiment the timestamps 130 of Ron's photos 740 are used by the enhanced APGE 400 to group all of Ron's photos 740 into the event group 760 with Ben's photos 730 and 750. In this example, however, none of Ron's photos 740 have GPS information 420 and each of their photo names 480 is dissimilar to the photo names 480 of each of Ben's photos 730 and 750.

In an embodiment, as Ron's photos 740 that are within the event group 760 are all stored in Ben's photo folder hierarchy 700 in the same XMAS EVE folder 705 as Ben's photos 730 the enhanced APGE 400 automatically groups Ron's photos 740 in the same event subgroup 762 with Ben's photos 730.

FIGS. 8A-8G illustrate an embodiment logic flow for the embodiment enhanced APGE 400 of FIG. 4. In the embodiment logic flow of FIGS. 8A-8G automatic photo grouping is accomplished utilizing photo timestamps, photo GPS, photo names and/or photo folder placement as criteria for grouping.

While the following discussion is made with respect to systems portrayed herein the operations described may be implemented in other systems. The operations described herein are not limited to the order shown. Additionally, in other alternative embodiments more or fewer operations may be performed.

Figure 8A:
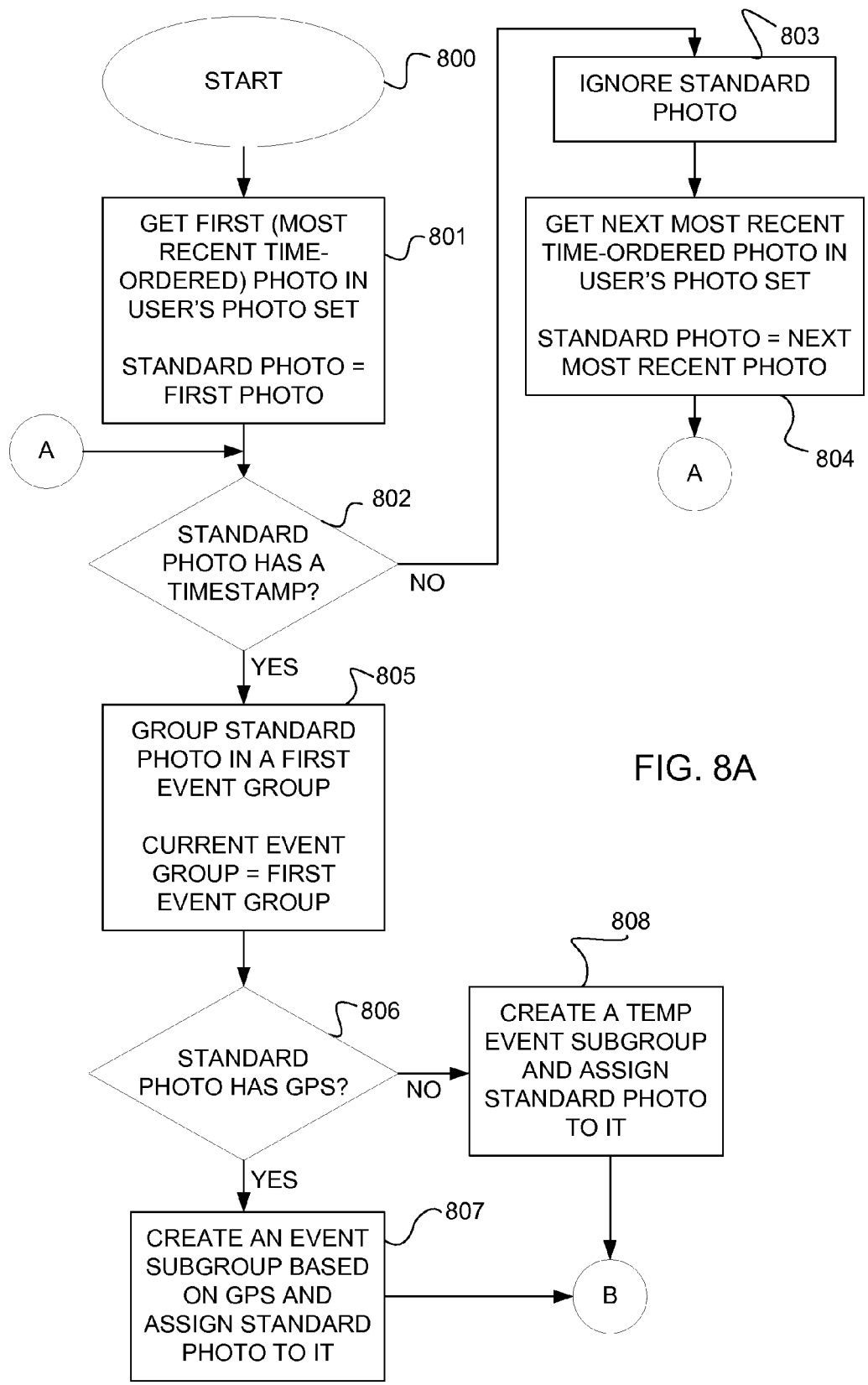
FIGS. 8A-8G depict an embodiment logic flow for automatic photo grouping utilizing photo timestamps, photo GPS, photo names and/or photo folder placement as grouping criteria.

Referring to FIG. 8A automatic photo grouping starts 800, or is otherwise initiated. In an aspect of this embodiment automatic photo grouping starts 800 at the directive, or command, of a user, e.g., when the user first initiates automatic photo grouping, when the user changes their screen view to select a new grouping of photos to be displayed, etc. In an aspect of this embodiment automatic photo grouping starts 800 when a program that instigates automatic photo grouping is activated to run by, e.g., a user, by the computing system hosting the automatic photo grouping methodology, at a predefined time, etc.

In this embodiment it is assumed that the photos 110 of a set of user's photos 175 have already been ordered from most recently taken to least recently taken. For purposes of this document the ordering of the photos 110 of the user's set of photos 175 can be assumed to be part of the start step 800.

In an embodiment the first, most recent time-ordered, photo in a user's photo set is gotten, or otherwise identified, 801. For purposes of discussion this first photo is initially identified as the standard photo 801. For purposes of this discussion standard is simply a title used to designate a particular photo that will be used to compare another user photo to and is not intended to limit this discussion or the claims. In this embodiment the timestamp 130 of the standard photo is compared with the timestamp 130 of another photo 110 in the user's photo set 175 to determine where the other photo 110 is to be grouped 120.

In an embodiment at decision block 802 a determination is made as to whether the standard photo has an associated timestamp. In this embodiment it is assumed that photos 110 without timestamps 130 may be interspersed with photos 110 with timestamps 130.

If at decision block 802 the standard photo is found not to have an associated timestamp then in an embodiment it is ignored, or otherwise not processed, 803. In an alternative embodiment, when the standard photo does not have an accompanying timestamp it is grouped into its own individual event group 803. In another alternative embodiment, when the standard photo does not have an accompanying timestamp it is grouped into a timeless group with any other photos in the user's photo set that also lack a timestamp 803.

In an embodiment the next most recent time-ordered photo in the user's photo set is gotten, or otherwise identified, 804. For purposes of discussion this newly gotten photo is initially identified as the standard photo 804. Again, in an embodiment at decision block 802 a determination is made as to whether the standard photo has an associated timestamp.

If at decision block 802 it is found that the standard photo does have a timestamp then in an embodiment the standard photo is grouped into a first event group 805. For purposes of discussion this first event group is initially identified as the current event group 805. In this embodiment the current event group is the group that associated photos are to be currently assigned to, or otherwise placed in. For purposes of this discussion the titles first and current are used to denote a particular event group and are not intended to limit the discussion or claims in any manner.

In an embodiment at decision block 806 a determination is made as to whether the standard photo has GPS information associated with it. If yes, in an embodiment an event based subgroup is generated, or otherwise designated, and the standard photo is grouped into this newly designated event subgroup 807.

If at decision block 806 it is determined that the standard photo lacks GPS information than in an embodiment a temporary event subgroup is generated, or otherwise designated, and the standard photo is temporarily assigned to this temporary event subgroup 808.

Figure 8B:
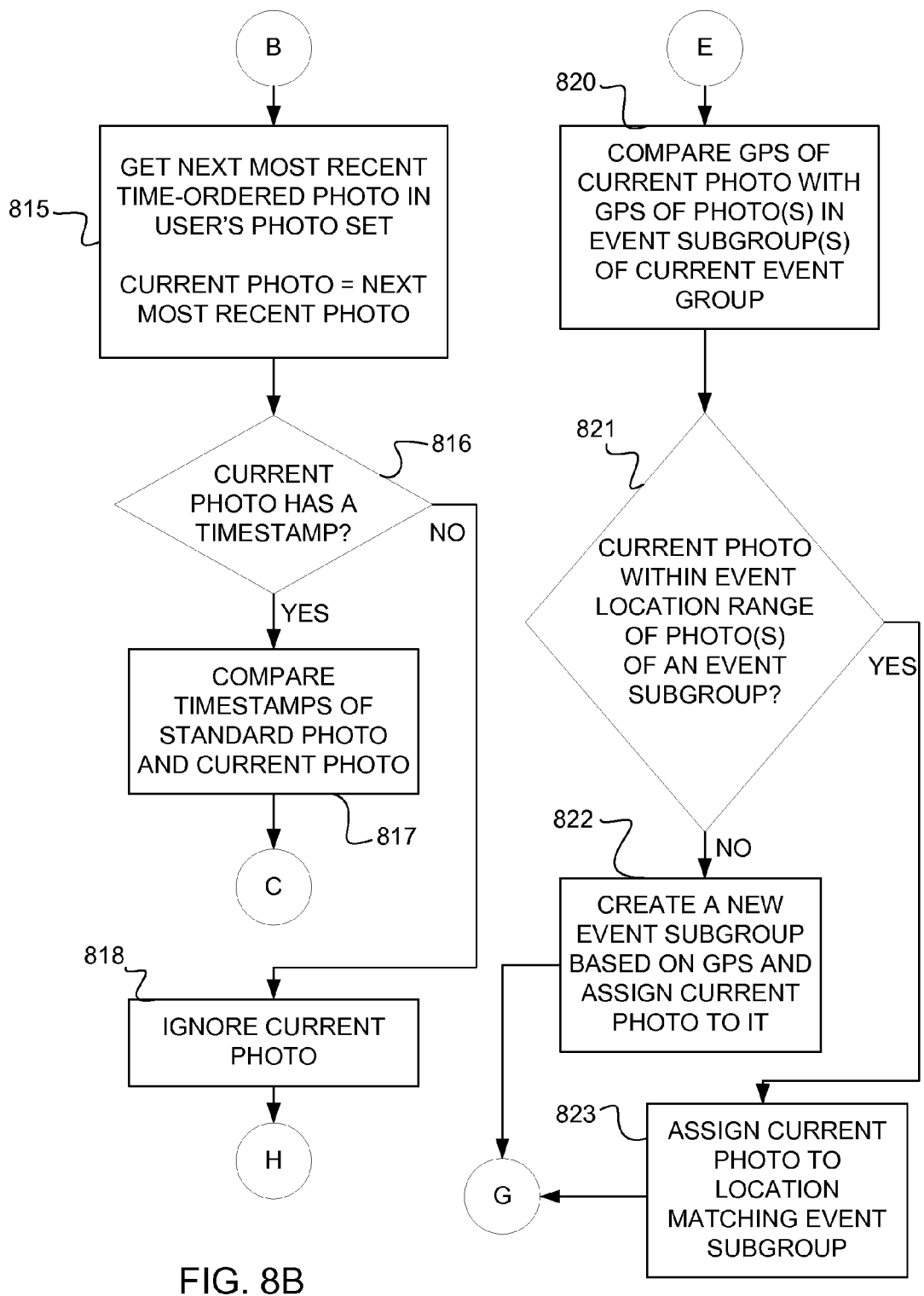

Referring to FIG. 8B, in an embodiment the next most recent time-ordered photo in the user's photo set is gotten or otherwise identified 815. For purposes of discussion this next most recent time-ordered photo is initially identified as the current photo 815. For purposes of discussion current is simply a title used to denote a particular photo that is being compared to determine its event grouping and is not intended to limit the discussion or claims in any manner.

In an embodiment at decision block 816 a determination is made as to whether the current photo has an associated timestamp. As mentioned, it is assumed that photos 110 without timestamps 130 may be interspersed with photos 110 with timestamps 130.

If at decision block 816 the current photo is found not to have a timestamp then in an embodiment the current photo is ignored, or otherwise not processed, 818. In an alternative embodiment, when the current photo does not have a timestamp it is grouped into its own individual event group 818. In another alternative embodiment, when the current photo does not have a timestamp it is grouped into a timeless event group with any other user photos that also lack a timestamp 818.

If at decision block 816 it is found that the current photo has a timestamp then in an embodiment the timestamps of the current photo and the standard photo are compared 817.

Figure 8C:
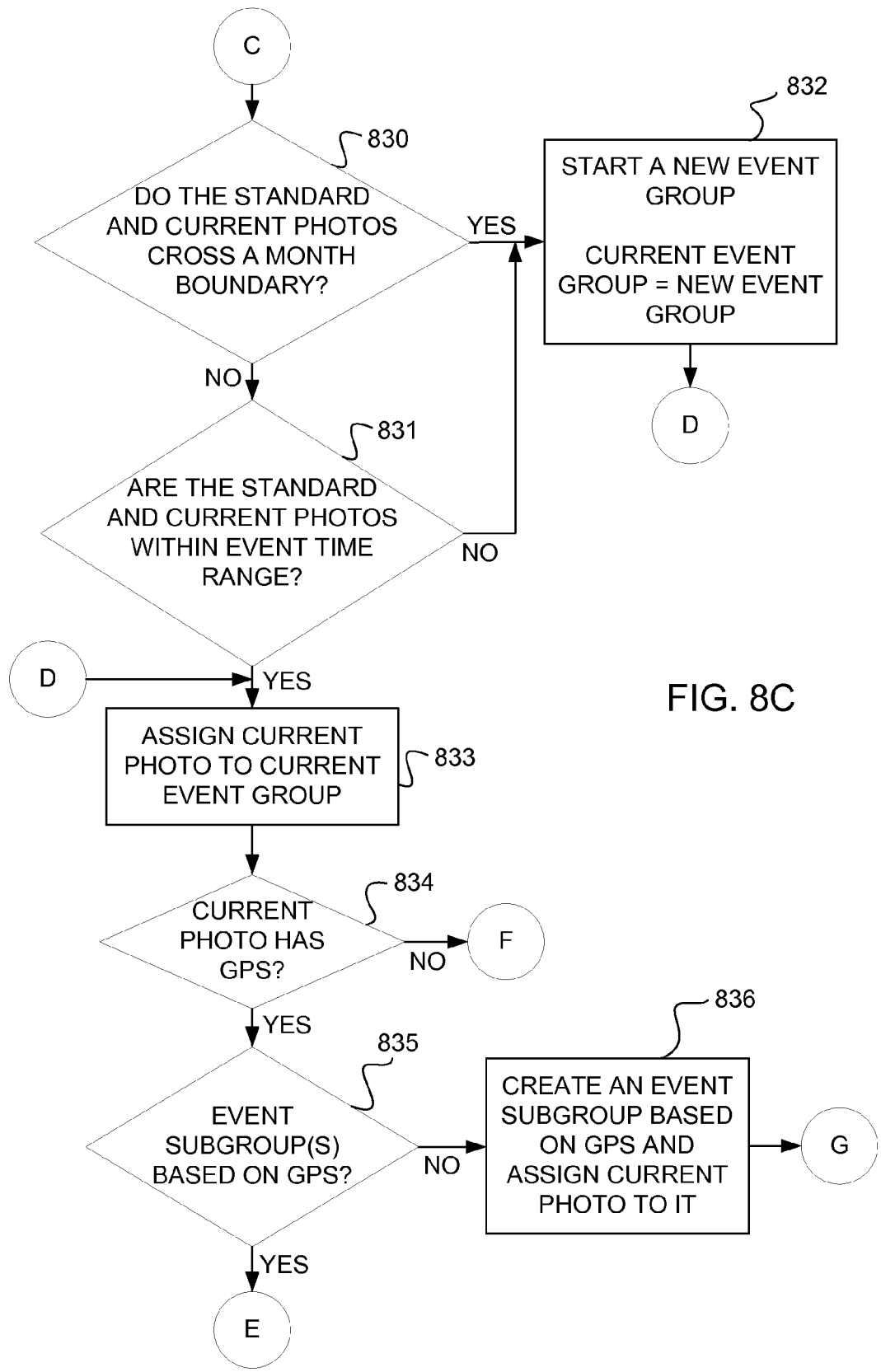

Referring to FIG. 8C, in an embodiment at decision block 830 a determination is made as to whether the current and standard photos cross a month boundary.

If the current and standard photos do cross a month boundary in an embodiment a new event group is started, initiated, or otherwise identified, 832. In an embodiment this new event group is now identified as the current event group 832. In an embodiment the current photo is assigned to, or otherwise identified with, the newly identified current event group 833.

If at decision block 830 it is determined that the current and standard photos do not cross a month boundary then in an embodiment at decision block 831 a determination is made as to whether the standard and current photos are within the event time range of each other.

If no, in an embodiment the current photo is determined to be from a different event than the standard photo. In an embodiment and under these circumstances a new event group is generated, initiated, or otherwise identified, 832. In an embodiment this new event group is now identified as the current event group 832. In an embodiment the current photo is assigned to, or otherwise identified with, the newly initiated current event group 833.

If at decision block 831 it is found that the standard and current photos are within the event time range then in an embodiment the current photo is assigned to, or otherwise identified with, the current event group 833.

In an embodiment at decision block 834 a determination is made as to whether the current photo has associated GPS information. If yes, in an embodiment at decision block 835 a determination is made as to whether there are any event subgroups based on, or otherwise defined by, GPS information. If no, in an embodiment a new event subgroup is generated, initiated, or otherwise identified in the current event group and the current photo is assigned to, or otherwise associated with, this new event subgroup 836.

Figure 8D:
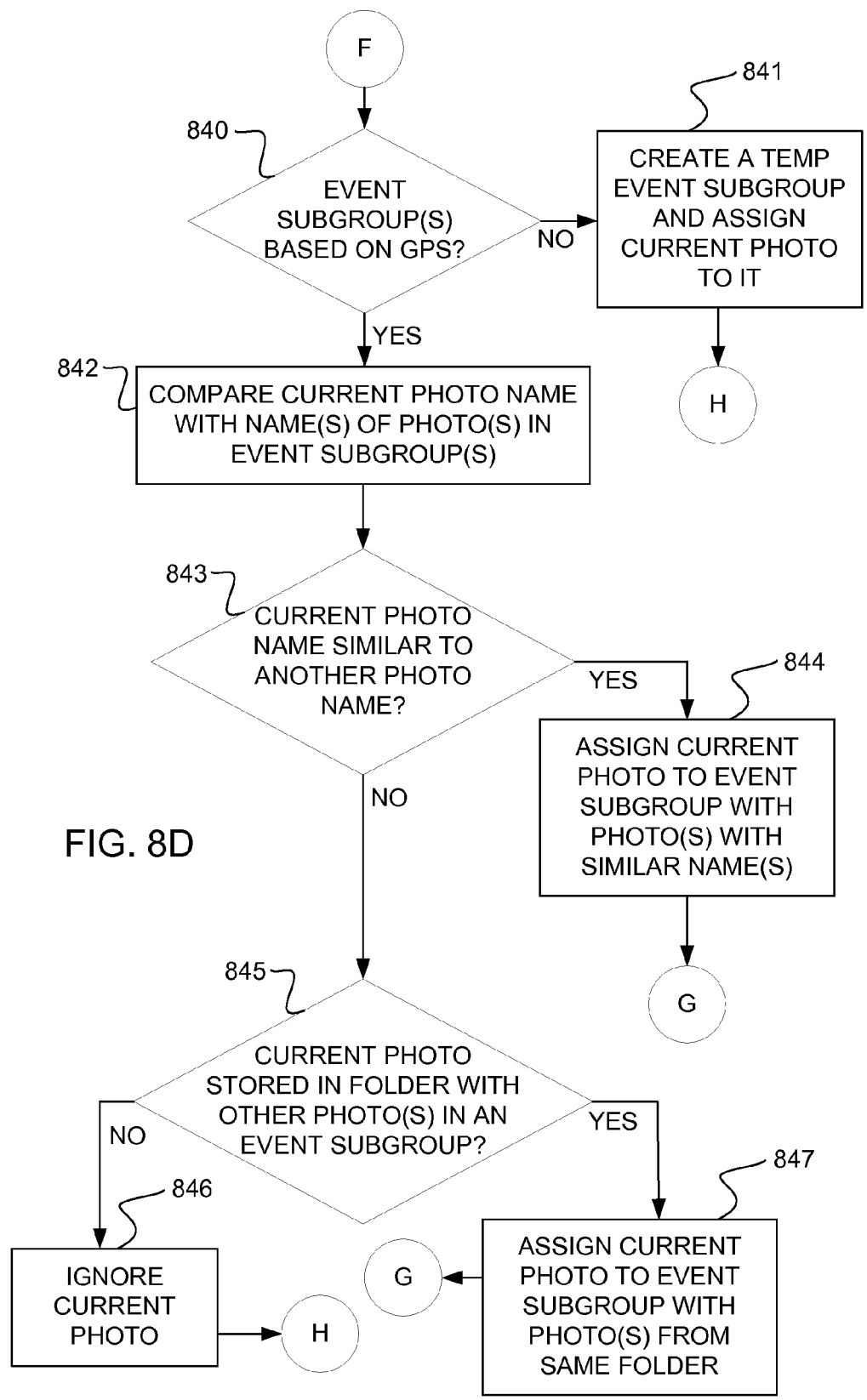
Figure 8E:
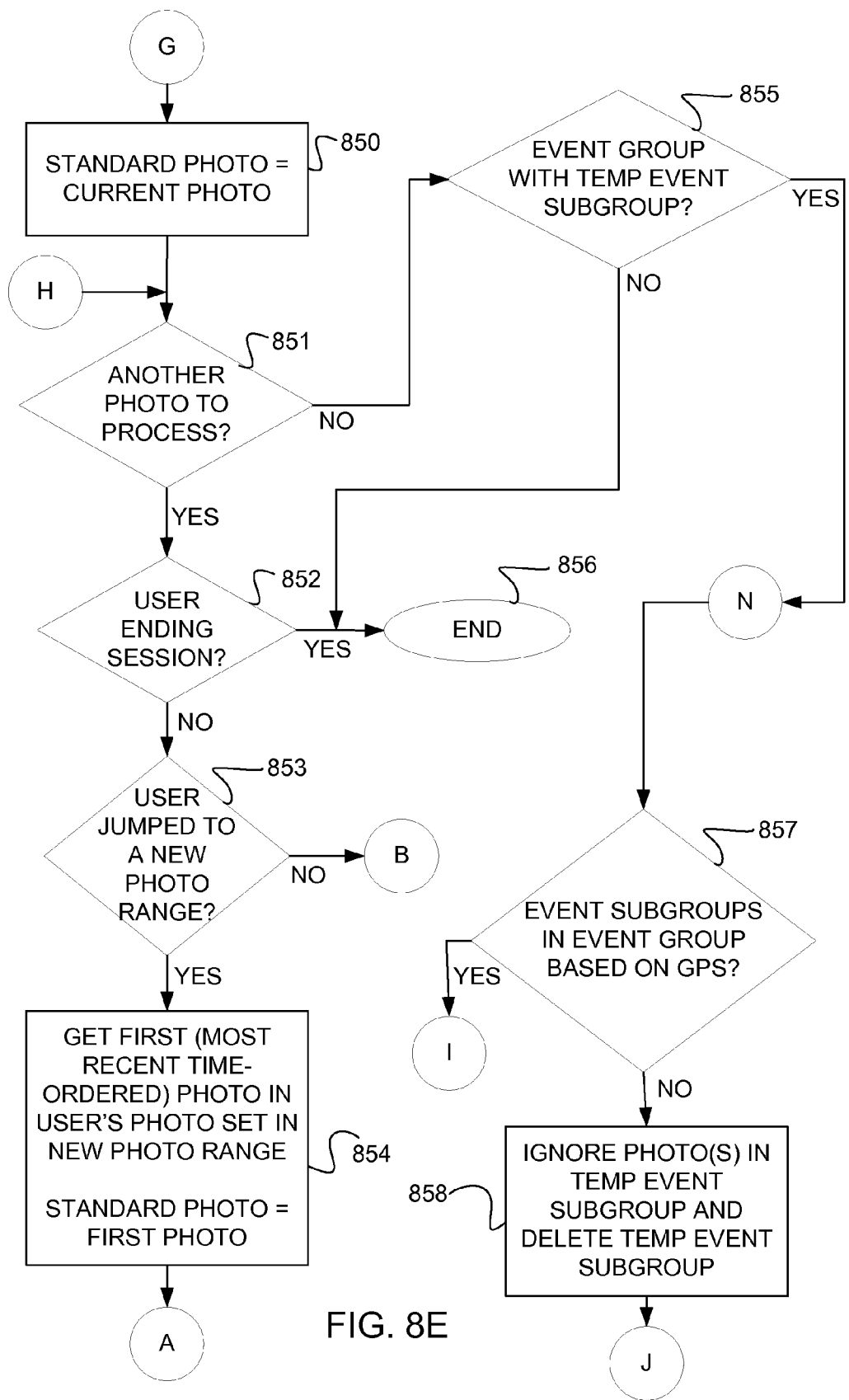

Referring to FIG. 8E, in an embodiment the current photo is now designated the standard photo 850. In an embodiment at decision block 851 a determination is made as to whether there are any more user photos to process.

Referring back to FIG. 8C, if at decision block 835 it is determined that there are existing event subgroups in the current event group that are based on, or otherwise defined by, GPS information than in an embodiment, and referring to FIG. 8B, the GPS information for the current photo is compared to the GPS information of the present standard photo to see if the photos are within event geographic range of each other 820. In alternative embodiments the GPS information for the current photo is compared to the GPS information of one or more photos in one or more event subgroups of the current event group to determine if the current photo and another, previously grouped, photo are within event geographic range of each other 820.

In an embodiment at decision block 821 a determination is made as to whether the current photo is within event location range of another, previously grouped, photo. If yes, in an embodiment the current photo is assigned to the event subgroup containing the previously grouped photo that the current photo is within event geographic range of 823. If, however, at decision block 821 the current photo is not found to be within event geographic range of any other, previously grouped, photo then in an embodiment a new event subgroup is generated, or otherwise initiated or designated, and the current photo is assigned to, or otherwise associated with, this newly initiated event subgroup 822.

Referring to FIG. 8E, in an embodiment the current photo is now designated the standard photo 850. In an embodiment at decision block 851 a determination is made as to whether there are any more user photos to process.

Referring back to FIG. 8C, if at decision block 834 it is determined that the current photo does not have any associated GPS information than in an embodiment, and referring to FIG. 8D, at decision block 840 a determination is made as to whether there are any event subgroups based on, or otherwise defined by, GPS information in the current event group. If no, in an embodiment a temporary event subgroup is generated, or otherwise identified or designated, and the current photo is temporarily assigned to this temporary event subgroup 841. Referring to FIG. 8E, in an embodiment at decision block 851 a determination is made as to whether there are any more user photos to process.

If at decision block 840 of FIG. 8D it is found that there are event subgroups in the current event group based on, or otherwise defined by, GPS information then in an embodiment the current photo name is compared with the photo name of the standard photo 842. In alternative embodiments if at decision block 840 it is found that there are event subgroups in the current event group based on GPS information then the current photo name is compared with the photo name(s) of one or more other previously grouped photos in the current event group 842.

In an embodiment at decision block 843 a determination is made as to whether the current photo name is similar to another, previously grouped, photo. If yes, in an embodiment the current photo is grouped with, or otherwise assigned to or associated with, the event subgroup containing a photo with a similar photo name 844. Referring to FIG. 8E, in an embodiment the current photo is now designated the standard photo 850 and at decision block 851 a determination is made as to whether there are any more user photos to process.

If at decision block 843 of FIG. 8D the current photo is not found to have a similar name to another previously grouped photo then in an embodiment at decision block 845 a determination is made as to whether the current photo is stored in a folder in a photo folder hierarchy with the standard photo. In alternative embodiments at decision block 845 a determination is made as to whether the current photo is stored in a folder with at least one other, previously grouped, photo. If yes, in an embodiment the current photo is assigned to the event subgroup that contains the photo whose folder the current photo shares 847. Referring to FIG. 8E, in an embodiment the current photo is now designated the standard photo 850 and at decision block 851 a determination is made as to whether there are any more user photos to process.

Referring back to FIG. 8D, if at decision block 845 the current photo is not found to be stored in a folder in a photo folder hierarchy with another photo previously grouped into an event subgroup based on GPS information than in an embodiment the current photo is ignored for purposes of event grouping 846. In an embodiment, and referring to FIG. 8E, at decision block 851 a determination is made as to whether there are any more user photos to process.

In an aspect of this embodiment a determination is made as to whether there is another photo 110 to be processed in the defined maximum subset of photos 195 to be currently processed. In an alternative aspect of this embodiment a determination is made as to whether there is another photo 110 to be processed in the set of user's photos 175.

If at decision block 851 there is at least one more photo to be processed then in an embodiment at decision block 852 a determination is made as to whether the user is ending the automatic grouping processing. If yes, in an embodiment automatic event group processing is ended 856.

If at decision block 852 the user is not ending the automatic photo group processing then in an embodiment at decision block 853 a determination is made as to whether the user has jumped, or changed, i.e., scrolled, to a new photo time range within their set of user's photos. If no, and referring back to FIG. 8B, in an embodiment the next most recent time-ordered photo in the user's photo set is gotten, or otherwise identified, 815 and processing continues as previously described.

If at decision block 853 of FIG. 8E the user has changed photo time ranges, then in an embodiment the most recent time-ordered photo in the user's photo set in the new photo time range is gotten, or otherwise identified, 854. For purposes of discussion this new most recent time-ordered photo is identified as the standard photo 854. In an embodiment, and referring to FIG. 8A, at decision block 802 a determination is made as to whether the standard photo has a timestamp and processing continues as previously described with the new range of user's photos.

Referring back to decision block 851 of FIG. 8E, if it is determined that there are no more user photos to process for automatic grouping, i.e., the last photo in the set 175 or maximum defined subset 195 of user photos 110 has been processed, then in an embodiment at decision block 855 a determination is made as to whether there is an event group with a temp event subgroup. In this embodiment and at decision block 855 a determination is made as to whether there are any photos 110 that could not previously be grouped into an event, i.e., event subgroup 425, because, e.g., they lack GPS information 420, but that may now be able to be grouped based on other criteria, e.g., photo name 414 or photo folder 416, because all other user photos 110 have been processed.

If at decision block 855 there are no event groups with temporary event subgroups then in an embodiment automatic photo group processing is ended 856.

If at decision block 855 there is an event group with a temporary event subgroup then in an embodiment a determination is made at decision block 857 as to whether there are event subgroups in the event group that are based on, or otherwise defined by, GPS information. In other words, in this embodiment a determination is made at decision block 857 as to whether the current event group containing the temporary event subgroup also has one or more event subgroups of photos that have been grouped together as events based on their timestamp and GPS information. If no, then in an embodiment all the photos in the temporary event subgroup are ignored for automatic photo grouping 858. In an embodiment the temporary event subgroup is deleted, or otherwise ignored, 858.

Figure 8F:
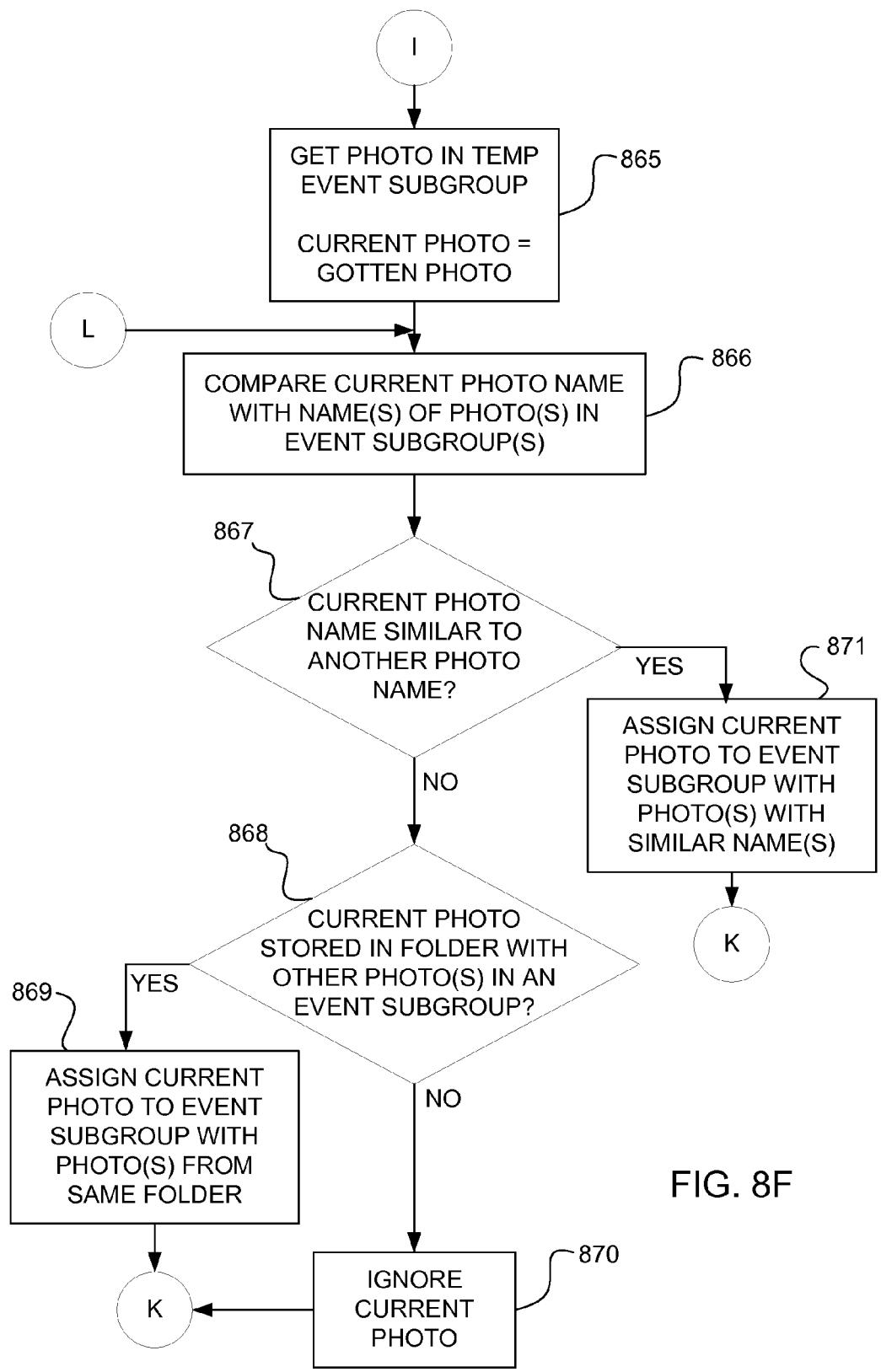
Figure 8G:
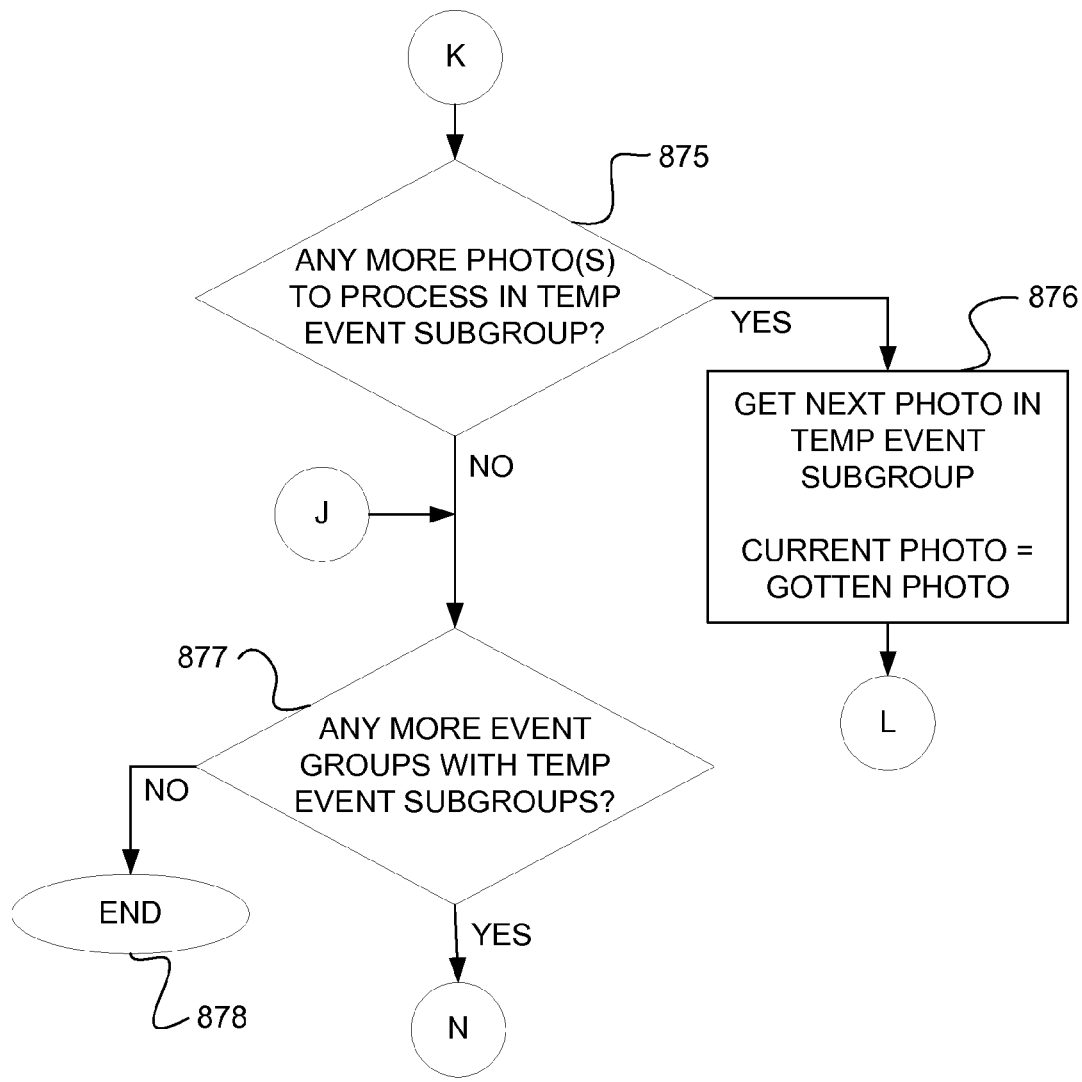

In an embodiment, and referring to FIG. 8G, at decision block 877 a determination is made as to whether there are any other event groups with temporary event subgroups. If no, in an embodiment automatic photo group processing is ended 878.

If at decision block 877 there is another event group with a temporary event subgroup then in an embodiment processing returns to decision block 857 of FIG. 8E where a determination is again made as to whether the current event group containing the temporary event subgroup also has one or more event subgroups of photos that have been grouped together as events based on their timestamp and GPS information.

If at decision block 857 there are event subgroups in the event group containing a temporary event subgroup that are based on, or otherwise defined by, GPS information then in an embodiment and referring to FIG. 8F, a photo in the temporary event subgroup is gotten, or otherwise identified 865. For purposes of discussion the gotten photo is designated the current photo 865. In an embodiment the photo name of the current photo is compared with the names of photos in event subgroups of the event group 866. In an alternative embodiment the photo name of the current photo is compared with one or more names of photos in an event subgroup containing a photo that has the closest timestamp to the current photo's timestamp 866. In other alternative embodiments the photo name of the current photo is compared with one or more names of photos in one or more event subgroups of the event group, e.g., with the name of the last photo grouped into each event subgroup, with the name of the first photo grouped into each event subgroup, with the name of the last photo grouped into the event subgroup containing a photo with the closest timestamp to the timestamp of the current photo, etc.

In an embodiment at decision block 867 a determination is made as to whether the name of the current photo is similar to the name of another photo grouped into an event subgroup of the event group containing the current photo. If yes, in an embodiment the current photo is assigned to the event subgroup containing a photo with a similar name 871. In an embodiment, and referring to FIG. 8G, at decision block 875 a determination is made as to whether there are any more photos to process in the temporary event subgroup. If yes, another photo in the temporary event subgroup is gotten, or otherwise identified 876. For purposes of discussion the gotten photo is designated the current photo 876, and processing continues as has been described.

If at decision block 875 there are no more photos to process in the temporary event subgroup then in an embodiment at decision block 877, as previously described, a determination is made as to whether there are any other event groups with temporary event subgroups.

Referring back to FIG. 8F, if at decision block 867 there are no photos in any of the event subgroups in the event group containing the current photo from the temporary event subgroup with a similar name then in an embodiment at decision block 868 a determination is made as to whether the current photo is stored in a folder with other photos that are grouped into event subgroups. If yes, in an embodiment the current photo is assigned to the event subgroup containing the photo(s) from the same storage folder 869. If no, the current photo is ignored 870, i.e., it is not grouped with any event subgroup.

Whether or not the current photo is assigned to an event subgroup based on its folder location in an embodiment, and referring again to FIG. 8G, at decision block 875 a determination is made as to whether there are any more photos to process in the temporary event subgroup.

Figure 9:
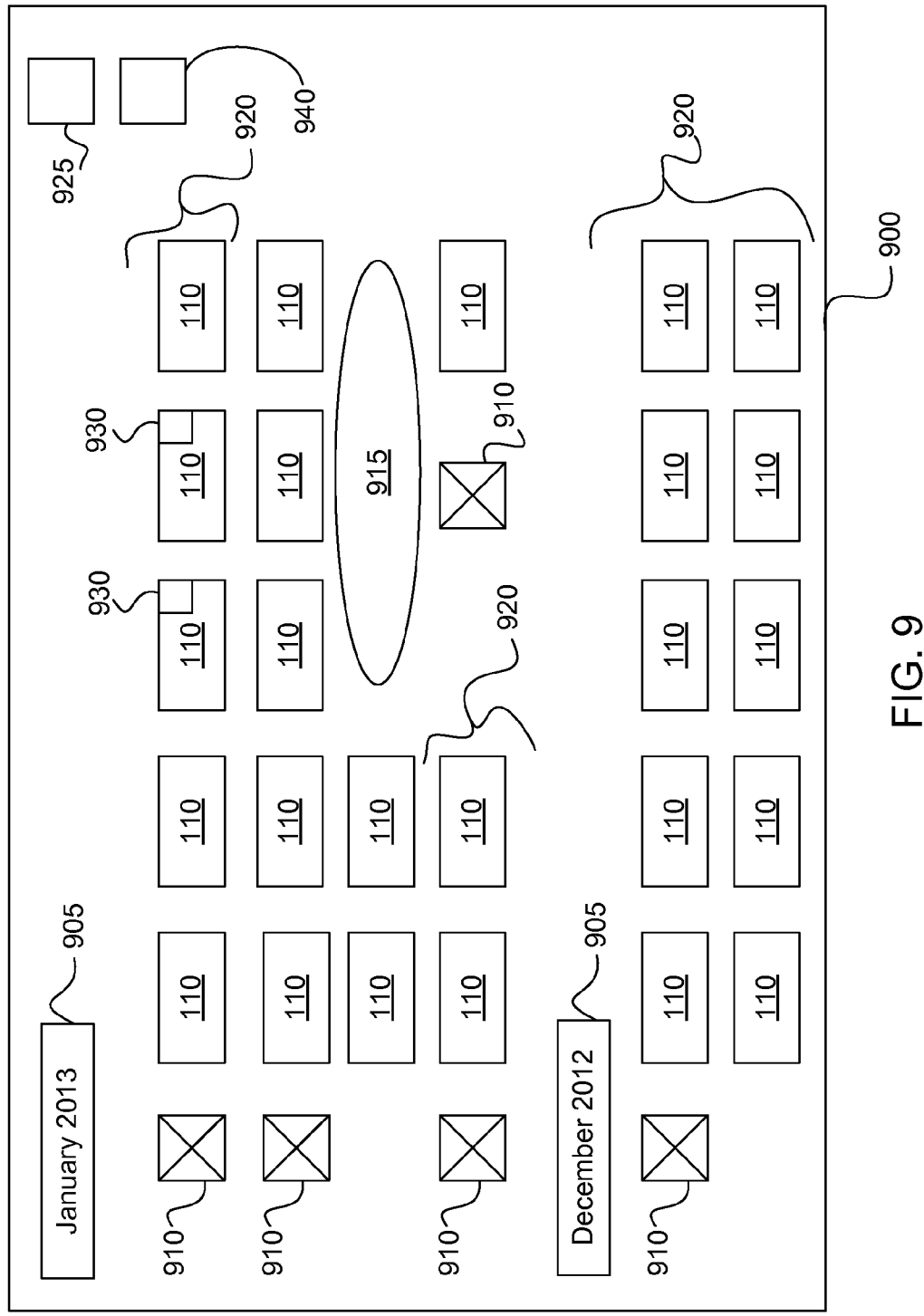
FIG. 9 is an embodiment first view output by an embodiment APGE.

FIG. 9 depicts an embodiment first view 900 of user photos 110 displayed on a computing device output by an embodiment APGE, e.g., the APGE 100, the APGE 400, etc.

In an embodiment a user 160 can activate the first view 900 by pressing, i.e., making contact with, a touch screen button included on a photo display output. In an embodiment the touch screen button activating the first view 900 is identified as a "PHOTO GROUP" button. In other embodiments the touch screen button activating the first view 900 can be identified by myriad other titles, symbols, etc.

In other embodiments a user 160 can activate the first view 900 to be displayed to their computing device output by other measures, including but not limited to, pressing a particular keyboard key, pressing a particular group of two or more keyboard keys simultaneously, inputting a specific command via a command line, etc.

Figure 10:
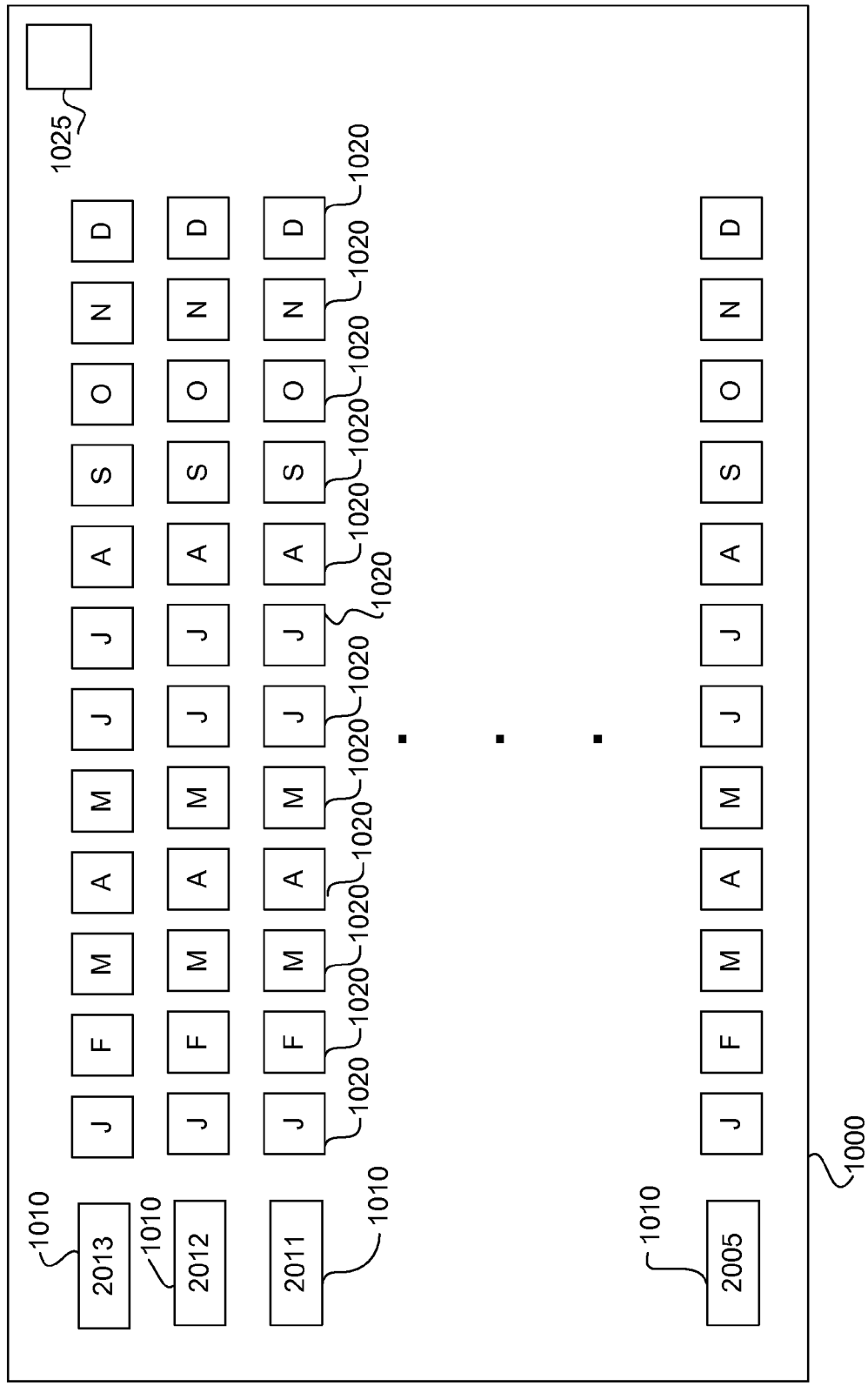
FIG. 10 is an embodiment second view output by an embodiment APGE.

In an embodiment, when a user activates the first view 900, the APGE 100 or APGE 400, collectively referred to herein as the APGE 400 for purposes of discussion with reference to FIGS. 9 and 10, begins processing as previously discussed herein and outputs the first view 900 to the user 160. In an embodiment the first view 900 displays grouped photos from the most recent event to the least recent event. In an embodiment a user 160 can scroll the first view 900 to display earlier photo events, and subsequently, redisplay more recent photo events.

In an embodiment the first view 900 identifies each month 905 that contains an event, i.e., a grouping 920 of user's photos 110 that the APGE 400 has determined to be of the same event. In an alternative embodiment the first view 900 identifies each month 905 of the calendar beginning with the most recent month that contains an event 920. In this alternative embodiment a month 905 may be identified in the first view 900 but have no user photos 110 associated with it as the APGE 400 did not identify an event 920 defined by photos 110 within that month.

In an embodiment the first view 900 contains an event tile 910 for each event group 920. In an embodiment an event tile 910 represents the division of groups 920 of user photos 110. In an embodiment each event tile 910 includes the date and time of the most recent photo 110 included in the group 920 for which the event tile 910 represents. In an alternative embodiment each event tile 910 includes the date and time of the least recent, i.e., earliest, photo 110 included in the group 920 for which the event tile 910 represents. In a second alternative embodiment each tile 910 includes the date(s) and times for the most recent and least recent photos 10 included in the group 920 for which the event tile 910 represents.

In an embodiment white space 915 is utilized in the first view 900 to delineate groupings 920 of photos 110.

In an embodiment all photos 110 in a group 920 are shown in the first view 900 from most recent to least recent and all groupings 920 as represented by event tiles 910 are also shown from most recent to least recent.

In an embodiment a user 160 can deactivate the first view 900 and return to another photo display output by pressing, i.e., making contact with, a touch screen button 925 included in the first view 900. In an embodiment the touch screen button 925 is identified as an "END" button. In other embodiments the touch screen button 925 can be identified by myriad other titles, symbols, etc.

In other embodiments a user 160 can deactivate the first view 900 by other measures, including but not limited to, pressing a particular keyboard key, pressing a particular group of keyboard keys simultaneously, inputting a specific command via a command line, etc.

In an embodiment, if a user 160 selects an event tile 910 this causes all the photos 110 in the grouping 920 represented by the event tile 910 to be selected. In an embodiment an event tile 910 acts as a toggle button that can be selected and alternatively deselected.

In an embodiment more than one event tile 910 can be selected at a time. In an embodiment once one or more event tiles 910 in the first view 900 are selected the user 160 can act on the selected photos 110 of all the selected groups 920 as one conglomerate group, i.e., move the photos 110 from all selected groups 920 together, share the photos 110 from all selected groups 920 together, copy the photos 110 from all selected groups 920 together, delete the photos 110 from all selected groups 920 together, etc.

In an embodiment each user photo 110 displayed in the first view 900 has an associated checkbox 930 for selecting the photo 110. In an embodiment the checkbox 930 for a photo 110 only becomes visible to a user 160 when the user utilizes some selection device, e.g., their finger, a mouse, a stylus, etc., to hover over the respective photo 110.

In an embodiment a photo's checkbox 930 is a toggle button to be selected and alternatively deselected.

In an embodiment more than one photo's checkbox 930 can be selected at a time. In an embodiment once one or more user photos 110 in the first view 900 are selected via their checkbox(s) 930 the user 160 can act on the selected photos 110 as a group, i.e., move them together, shared them together, copy them together, delete them together, etc.

FIG. 10 depicts an embodiment second view 1000 displayed on a computing device output by an embodiment APGE, e.g., the APGE 100 of FIG. 1, the APGE 400 of FIG. 4, etc.

In an embodiment a user 160 can activate the second view 1000 by pressing, i.e., making contact with, a touch screen button 940 in an embodiment first view 900 as shown in FIG. 9. In an embodiment the touch screen button 940 activating the second view 1000 is identified as an "INDEX" button 940. In other embodiments the touch screen button 940 can be identified by myriad other titles, symbols, etc.

In other embodiments a user 160 can activate the second view 1000 by other measures, including but not limited to, pressing a particular keyboard key, simultaneously pressing a particular group of keys, inputting a specific command via a command line, etc.

In an embodiment the second view 1000 helps facilitate a user 160 quickly and efficiently finding a specific grouping 920 of photos 110, especially when there are many user photos 110 that have been processed by the APGE 400 and grouped into various events 920.

In an embodiment the second view 1000 includes year tiles 1010. In an embodiment each year tile 1010 is a touch screen button that can be activated by a user 160. In an alternative embodiment only those year tiles 1010 that have associated event grouping(s) 920 of user photos 110 are touch screen buttons. In a second alternative embodiment no year tiles 1010 are touch screen buttons that can be activated by a user 160; they each are merely labels included in the second view 1000 for user reference.

In an embodiment a year tile 1010 is output in the second view 1000, as a user 160 scrolls, for each calendar year beginning with the most recent year for which there is an event grouping 920 of user photos 110. In an alternative embodiment a year tile 1010 is output in the second view 1000, as a user 160 scrolls, for only those calendar years for which there is at least one event grouping 920 of user photos 110.

In an embodiment year tiles 1010 are displayed in the second view 1000 from most recent to least recent. In an alternative embodiment year tiles 1010 are displayed from least recent to most recent. In a second alternative embodiment there is a touch screen toggle button in the second view 1010 that allows for a user 160 to change the year tile 1010 display to start from least recent to most recent, and vice versa.

In an embodiment if a year tile 1010 is selected then the user 160 is provided a first view 900 that begins with the most recent photo grouping 920 in the year representing the selected year tile 1010. Thus, for example, if a user's photos 110 span the years two thousand and thirteen (2013) to nineteen eighty-five (1985), the first time the user 160 is provided a first view 900 in an embodiment the most recent photo group(s) 920 from two thousand thirteen (2013) will be displayed first. Thereafter, if the user 160 selects the touch screen button 940 they will be provided a second view 1000 that can include year tiles 1010 ranging from two thousand thirteen (2013) to nineteen eighty-five (1985), although the user 160 may have to scroll in the second view 1000 to ultimately see all these year tiles 1010. In this example if the user 160 selects the year tile 1010 for nineteen ninety (1990) a first view 900 will again be presented to the user 160 that begins with the most recent photo group 920 from nineteen ninety (1990). In this manner a user 160 can quickly go to photo groups 920 from any year.

In an embodiment the second view 1000 includes month tiles 1020. In an embodiment each month tile 1020 is a touch screen button that can be activated by a user 160. In an alternative embodiment only those month tiles 1020 that have associated event grouping(s) 920 of user photos 110 are touch screen buttons.

In an embodiment there is a month tile 1020 output in the second view 1000 for each month of each year for which there is a respective year tile 1010. In an alternative embodiment there is a month tile 1020 output in the second view 1000 for only those months of a year for which there is an event grouping 920 of user photos 110.

In an embodiment month tiles 1020 are displayed in the second view 1000 from January to December; i.e., from least recent to most recent. In an alternative embodiment month tiles 12020 are displayed in the second view 1000 from December to January.

In an embodiment if a month tile 1020 is selected then the user 160 is provided a first view 900 that begins with the most recent photo grouping 920 in the year/month representing the selected month tile 1020. In this manner a user 160 can quickly go to photo groups 920 from any month/year containing photo groupings 920.

In an embodiment a user 160 can deactivate the second view 1000 and return to the last displayed first view 900 by selecting a touch screen button 1025 in the second view 1000. In an alternative embodiment selecting the touch screen button 1025 returns a known photo display output, e.g., a film strip of all user pictures 110. In an embodiment the touch screen button 1025 is identified as a "RETURN" button. In other embodiments the touch screen button 1025 can be identified by myriad other titles, symbols, etc.

In other embodiments a user 160 can deactivate the second view 1000 by other measures, including but not limited to, pressing a particular keyboard key, simultaneously pressing a particular group of keys, inputting a specific command via a command line, etc.

In an embodiment a first view 900 and a second view 1000 is regenerated on the fly when a user 160 commands the respective view.

In embodiments discussed herein, user photos 110 with no timestamp 130 are ignored for purposes of automatic photo event grouping, and are not displayed in the embodiment first view 900. In other alternative embodiments user photos 110 with no timestamp 130 are displayed together in their own separate event grouping 920; grouped, if possible, based on their photo name 480 and displayed in the first view 900 accordingly; grouped, if possible, based on the folder 702 they are stored in and displayed in the first view 900 accordingly; etc.

Figure 11:
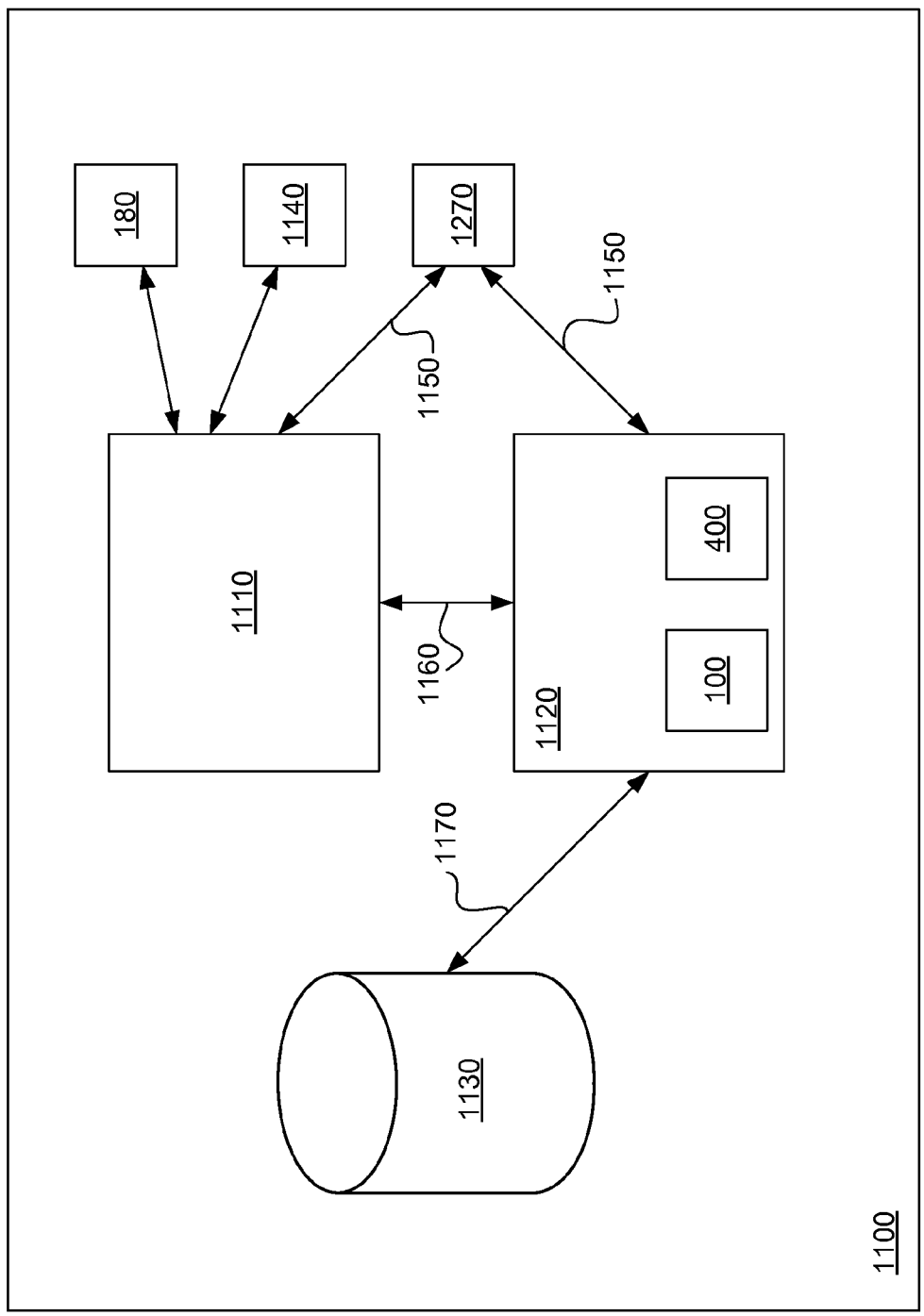
FIG. 11 is a block diagram of an exemplary computing environment that supports APGE operations.

FIG. 11 depicts a block diagram of an exemplary computing environment 1100 that supports embodiment APGE 100 and 400 operations. In an embodiment a user 160 can access and utilize an embodiment APGE from their client device 1110. Exemplary embodiment client devices 1110 are further discussed with reference to FIG. 12 below.

In an embodiment the client device 1110 can communicate with a photographic-capable device 180 for accessing, or otherwise retrieving, photos 110. As previously discussed, embodiment photographic-capable devices 180 include, but are not limited to, cameras, cellphones, computing tablets, etc.

In an embodiment the client device 1110 can communicate with other client devices 1140, via a direct connection, a LAN 1265, the internet 1270, etc., for accessing photos 110.

In an embodiment the client device 1110 can communicate with other devices and with applications hosted, or otherwise accessible, by the internet 1270.

In an embodiment the client device 1110 communicates with a server 1120 that supports embodiment APGE 100 and 400 processing. In an embodiment the client device 1110 communicates 1150 with the server 1120 via the internet 1270. In an alternate embodiment the client device 1110 can communicate 1160 with the server 1120 via a direct connection.

In an embodiment the server 1120 communicates 1170 with a database 1130 that stores users' photos 110 that can be processed by the embodiment APGEs 100 and 400. In an embodiment the database 1130 is a separate storage device from the server 1120. In alternate embodiments the database 1130, or a portion of the database 1130, is a component of the server 1120. In an embodiment the database 1130 organizes users' photos in timestamp 130 order. In an embodiment this photo timestamp order is then utilized by the embodiment APGEs 100 and 400 as previously described.

Computing Device System Configuration

Figure 12:
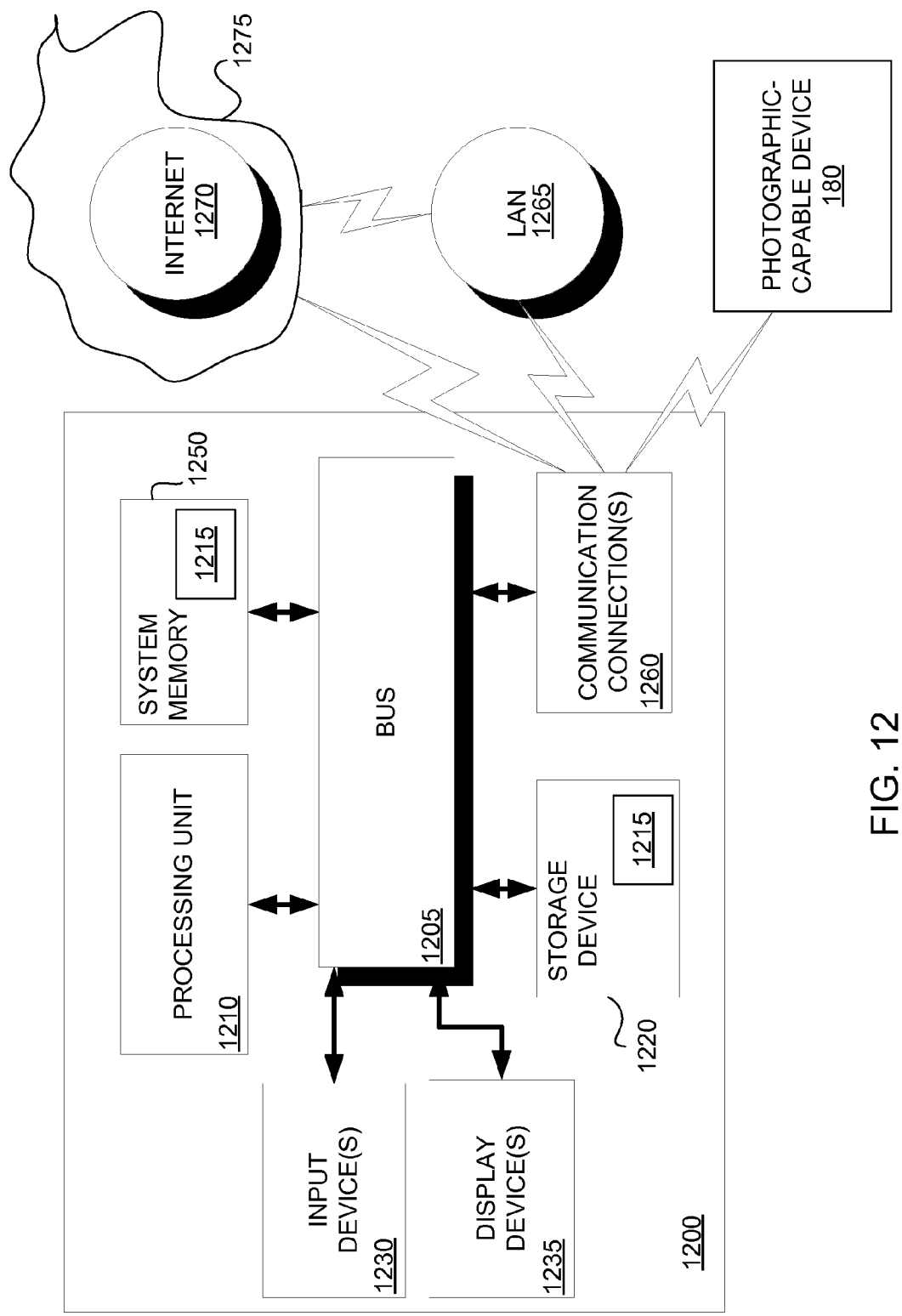
FIG. 12 is a block diagram of an exemplary basic computing device with the capability to process software, i.e., program code, or instructions.

FIG. 12 is a block diagram that illustrates an exemplary computing device system 1200 upon which embodiment APGEs, e.g., 100 and 400, can be implemented on and/or commanded from. Examples of computing device systems, or computing devices, 1200 include, but are not limited to, servers 1120, server systems, computers, e.g., desktop computers, computer laptops, also referred to herein as laptops, notebooks, computing tablets, etc.; etc.

The embodiment computing device system 1200 includes a bus 1205 or other mechanism for communicating information, and a processing unit 1210, also referred to herein as a processor 1210, coupled with the bus 1205 for processing information. The computing device system 1200 also includes system memory 1250, which may be volatile or dynamic, such as random access memory (RAM), non-volatile or static, such as read-only memory (ROM) or flash memory, or some combination of the two. The system memory 1250 is coupled to the bus 1205 for storing information and instructions 1215 to be executed by the processing unit 1210, and may also be used for storing temporary variables or other intermediate information during the execution of instructions 1215 by the processor 1210. The system memory 1250 often contains an operating system and one or more programs, or applications, and/or software code, 1215 and may also include program data 1215.

In an embodiment a storage device 1220, such as a magnetic or optical disk, solid state drive, flash drive, etc., is also coupled to the bus 1205 for storing information, including program code of instructions 1215 and/or data 1215, e.g., volumes. In the embodiment computing device system 1200 the storage device 1220 is computer readable storage, or machine readable storage, 1220.

Embodiment computing device systems 1200 generally include one or more display devices 1235, such as, but not limited to, a display screen, e.g., a cathode ray tube (CRT) or liquid crystal display (LCD), a printer, and one or more speakers, for providing information to the computing device's system administrators and users 160. Embodiment computing device systems 1200 also generally include one or more input devices 1230, such as, but not limited to, a keyboard, mouse, trackball, pen, voice input device(s), and touch input devices, which the system administrators and users 160 can utilize to communicate information and command selections to the processor 1210. All of these devices 1230 are known in the art and need not be discussed at length here.

The processor 1210 executes one or more sequences of one or more programs, or applications, and/or software code instructions 1215 resident in the system memory 1250. These instructions 1215 may be read into the system memory 1250 from another computing device-readable medium, including, but not limited to, the storage device 1220. In alternative embodiments, hard-wired circuitry may be used in place of or in combination with software instructions 1215. Embodiment computing device system 1200 environments are not limited to any specific combination of hardware circuitry and/or software.

The term "computing device-readable medium" as used herein refers to any medium that can participate in providing program, or application, and/or software instructions 1215 to the processor 1210 for execution. Such a medium may take many forms, including but not limited to, storage media and transmission media. Examples of storage media include, but are not limited to, RAM, ROM, EEPROM, flash memory, solid state drive, CD-ROM, USB stick drives, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 1250 and storage device 1220 of embodiment computing device systems 1200 are further examples of storage media. Examples of transmission media include, but are not limited to, wired media such as coaxial cable(s), copper wire and optical fiber, and wireless media such as optic signals, acoustic signals, RF signals and infrared signals.

An embodiment computing device system 1200 also includes one or more communication connections 1260 coupled to the bus 1205. Embodiment communication connection(s) 1260 provide a two-way data communication coupling from the computing device system 1200 to other computing devices on a local area network (LAN) 1265 and/or wide area network (WAN), including the world wide web, or internet, 1270 and various other communication networks 1275, e.g., SMS-based networks, telephone system networks, etc.

Embodiment communication connection(s) 1260 also provide a two-way data communication coupling from the computing device system 1200 to photographic-capable devices 180 for accessing and retrieving user photos 110.

Examples of the communication connection(s) 1260 include, but are not limited to, an integrated services digital network (ISDN) card, modem, LAN card, and any device capable of sending and receiving electrical, electromagnetic, optical, acoustic, RF or infrared signals.

Communications received by an embodiment computing device system 1200 can include program, or application, and/or software instructions and data 1215. Instructions 1215 received by the embodiment computing device system 1200 may be executed by the processor 1210 as they are received, and/or stored in the storage device 1220 or other non-volatile storage for later execution.

Conclusion

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A system to perform automated photo grouping of a set of user photos, the system comprising:
a processing unit; and
a memory coupled to the processing unit, the memory configured to store instructions that are executable by the processing unit,
the processing unit configured to execute the instructions to perform operations comprising:
identify a first user photo associated with a first timestamp, the first timestamp indicating a time at which the first user photo is captured;
identify a second user photo associated with a second timestamp, the second timestamp indicating a time at which the second user photo is captured;
assign the first user photo to a first event group;
compare the first timestamp and the second timestamp to determine whether the second user photo is to be assigned to the first event group, a difference between the first timestamp and the second timestamp being less than a maximum length of time indicating that the second user photo is to be assigned to the first event group, the difference between the first timestamp and the second timestamp being greater than the maximum length of time indicating that the second user photo is not to be assigned to the first event group;
assign the second user photo to the first event group, which includes the first user photo, when a difference between the first timestamp and the second timestamp is less than the maximum length of time;
assign the second user photo to a second event group that does not include the first user photo when the difference between the first timestamp and the second timestamp is greater than the maximum length of time;
assign the first user photo to a first event subgroup of the first event group based on the first user photo being associated with first GPS information, the first GPS information indicating a first location at which the first user photo is captured;
determine second GPS information with which the second user photo is associated, the second GPS information indicating a second location at which the second user photo is captured;
calculate a distance between the first location and the second location;
divide the distance by the difference between the first timestamp and the second timestamp to provide a first distance over time value; and
assign the second user photo to the first event subgroup or another event subgroup of the first event group based on the first distance over time value, including:
assign the second user photo to the first event subgroup when the difference between the first timestamp and the second timestamp is less than the maximum length of time and the first distance over time value is less than a maximum distance over time value; and
assign the second user photo to a second event subgroup of the first event group when the difference between the first timestamp and the second timestamp is less than the maximum length of time and the first distance over time value is greater than the maximum distance over time value.

2. The system of claim 1, wherein the processing unit is configured to execute the instructions to perform the operations further comprising:
order at least a subset of the user photos based on a time at which each respective user photo was captured as identified by a timestamp associated with the respective user photo;
wherein the processing unit is configured to execute the instructions to identify the first user photo from the subset of the user photos; and
wherein the processing unit is configured to execute the instructions to identify the second user photo from the subset of the user photos.

3. The system of claim 2, wherein the processing unit is configured to execute the instructions to perform the operations further comprising:
identify a third user photo associated with a third timestamp, wherein the first user photo is captured later than the second user photo which is captured later than the third user photo;
compare the third timestamp and the second timestamp to determine whether the third user photo is to be assigned to the first event group, the second event group, or a third event group;
assign the third user photo to the first event group with the first user photo and the second user photo when a difference between the second timestamp and the third timestamp is less than the maximum length of time and the second user photo has been assigned to the first event group;
assign the third user photo to the second event group with the second user photo when the difference between the second timestamp and the third timestamp is less than the maximum length of time and the second user photo has been assigned to a second event group; and
assign the third user photo to the third event group that does not include the first user photo and that does not include the second user photo when the difference between the second timestamp and the third timestamp is greater than the maximum length of time.

4. The system of claim 1, wherein the processing unit is configured to execute the instructions to perform the operations further comprising:
identify a third user photo associated with a third timestamp, the third timestamp indicating a time at which the third user photo is captured, wherein the first user photo is captured later than the second user photo which is captured later than the third user photo;
compare the third timestamp and the second timestamp to determine a difference between the second timestamp and the third timestamp;
determine third GPS information with which the third user photo is associated, the third GPS information indicating a third location at which the third user photo is captured;
calculate a second distance between the second location and the third location;
divide the second distance by the difference between the second timestamp and the third timestamp to provide a second distance over time value;
assign the third user photo to the first event subgroup when the difference between the second timestamp and the third timestamp is less than the maximum length of time, the second user photo is assigned to the first event subgroup and the second distance over time value is less than the maximum distance over time value;

assign the third user photo to the second event subgroup when the difference between the second timestamp and the third timestamp is less than the maximum length of time, the second user photo is assigned to the second event subgroup and the second distance over time value is less than the maximum distance over time value;

calculate a third distance between the first location and the third location;

divide the third distance by a difference between the first timestamp and the third timestamp to provide a third distance over time value;

assign the third user photo to the first event subgroup when the difference between the second timestamp and the third timestamp is less than the maximum length of time, the second distance over time value is greater than the maximum distance over time value and the third distance over time value is less than the maximum distance over time value; and assign the third user photo to a third event subgroup of the first event group that does not include the first user photo and that does not include the second user photo when the difference between the second timestamp and the third timestamp is less than the maximum length of time, the second distance over time value is greater than the maximum distance over time value and the third distance over time value is greater than the maximum distance over time value.

5. The system of claim 1, wherein the second user photo is not associated with GPS information; and wherein the processing unit is configured to execute the instructions to perform the operations further comprising:
identify a third user photo associated with a third timestamp, the third timestamp indicating a time at which the third user photo is captured, wherein the first user photo is captured later than the second user photo which is captured later than the third user photo;
compare the third timestamp and the second timestamp to determine a difference between the second timestamp and the third timestamp;
determine third GPS information with which the third user photo is associated, the third GPS information indicating a third location at which the third user photo is captured;
calculate a second distance between the first location and the third location;
divide the second distance by a difference between the first timestamp and the third timestamp to provide a second distance over time value;
assign the third user photo to the first event subgroup when the difference between the first timestamp and the second timestamp is less than the maximum length of time, the difference between the second timestamp and the third timestamp is less than the maximum length of time, and the second distance over time value is less than a maximum distance over time value; and
assign the third user photo to a third event subgroup of the first event group that does not include the first user photo and that does not include the second user photo when the difference between the first timestamp and the second timestamp is less than the maximum length of time, the difference between the second timestamp and the third timestamp is less than the maximum length of time, and the second distance over time value is greater than the maximum distance over time value.

6. The system of claim 1, wherein the processing unit is configured to execute the instructions to perform the operations further comprising:
compare a name of the first user photo and a name of the second user photo in response to the second user photo not comprising GPS information and the difference between the first timestamp and the second time stamp being less than the maximum length of time; and
wherein the processing unit is configured to execute the instructions to assign the second user photo to the first event subgroup in response to at least one of (a) a determination that the name of the first user photo and the name of the second user photo include common letters or (b) a determination that a first number that is included in the name of the first user photo and a second number that is included in the name of the second user photo are within a predefined range of each other.

7. The system of claim 6, wherein the processing unit is configured to execute the instructions to perform the operations further comprising:
compare a storage folder of the first user photo and a storage folder of the second user photo to determine whether the storage folder of the first user photo and the storage folder of the second user photo are same, in response to at least one of (a) a determination that the name of the first user photo and the name of the second user photo do not include common letters or (b) a determination that a first number that is included in the name of the first user photo and a second number that is included in the name of the second user photo are not within a predefined range of each other; and
wherein the processing unit is configured to execute the instructions to assign the second user photo to the first event subgroup in response to a determination that the storage folder of the first user photo and the storage folder of the second user photo are the same.

8. The system of claim 1, wherein any photo of the set of user photos that lacks a timestamp is not assigned to an event group with any other photo in the set of user photos.

9. A method for automatically processing to assign a set of user photos to at least one group, the method comprising:
utilizing one or more first photo criteria to assign at least three user photos from the set of user photos to a first group using at least one element that includes at least one of (a) a processor or (b) hardware circuitry;
utilizing the one or more first photo criteria to assign at least one user photo from the set of user photos to a second group; and
utilizing one or more second photo criteria to assign at least two user photos from the at least three photos, which are assigned to the first group, to a first subgroup of the first group,
the utilizing the one or more second photo criteria comprising:
determining whether a first user photo is to be included among the at least two user photos, which include a second user photo, based on a comparison of a first value and a second value, the first value being a distance between a first location at which the first user photo is captured and a second location at which the second user photo is captured divided by a difference between a first time at which the first user photo is captured and a second time at which the second user photo is captured, the determining whether the first user photo is to be included among the at least two user photos comprising:
  determining that the first user photo qualifies to be assigned to a plurality of subgroups of the first group, and
  assigning the first user photo to a specified subgroup of the plurality of subgroups based on a difference between the first time at which the first user photo is captured and a time at which a user photo included in the specified subgroup is captured being less than differences between the first time at which the first user photo is captured and times at which other user photos in others of the plurality of subgroups are captured.

10. The method of claim 9, wherein at least one of the one or more first photo criteria corresponds to a time at which each photo in the at least three user photos and the at least one user photo is captured.

11. The method of claim 9, comprising:
utilizing the one or more first photo criteria to assign each user photo from the set of user photos to a group selected from a plurality of groups; and
utilizing the one or more second photo criteria to assign each user photo from the set of user photos to a subgroup of the group to which the user photo is assigned.

12. A method for automatically grouping a set of two or more user photos associated with two or more respective timestamps into events for a current photo grouping session, each timestamp of the two or more timestamps indicating a time at which the respective user photo is captured, a first user photo of the set is identified to be a standard photo, a first event group is designated to be a current event group and the first user photo is assigned to the first event group, the method performed for each remaining user photo of the set that has not been previously identified to be the standard photo for a current photo grouping session, the method comprising:
  identifying a user photo of the set to be a current photo, the user photo not having been previously identified to be the standard photo for the current photo grouping session;
  comparing the timestamp of the standard photo and the timestamp of the current photo, using at least one element that includes at least one of (a) a processor or (b) hardware circuitry, to determine a difference between the timestamp of the current photo and the timestamp of the standard photo;
  when the difference between the timestamp of the current photo and the timestamp of the standard photo is less than a maximum length of time,
    assigning the current photo to the current event group, and
    determining whether the current photo is to be assigned to a subgroup of the current event group to which the standard photo is assigned based on a comparison of a first value and a second value, the first value being a distance between a first location at which the current photo is captured and a second location at which the standard photo is captured divided by the difference between the timestamp of the current photo and the timestamp of the standard photo,
    the determining whether the current photo is to be assigned to the subgroup of the current event group to which the standard photo is assigned comprising:
      determining first GPS information with which the current photo is associated, the first GPS information indicating the first location at which the current photo is captured,
      determining the distance between the first location and the second location, the second location indicated by second GPS information with which the standard photo is associated,
      dividing the distance by the difference between the timestamp of the current photo and the timestamp of the standard photo to provide the first value,
      assigning the current photo to the subgroup of the current event group to which the standard photo is assigned when the first value is less than the second value, and
      assigning the current photo to a second subgroup of the current event group to which the standard photo is not assigned when the first value is greater than the second value;
  when the difference between the timestamp of the current photo and the timestamp of the standard photo is greater than the maximum length of time,
    designating a new event group,
    assigning the current photo to the new event group, and
    re-identifying the new event group to be the current event group subsequent to designating the new event group and assigning the current photo to the new event group; and
  re-identifying the current photo to be the standard photo subsequent to assigning the current photo to an event group.

13. The method of claim 12, further comprising,
ordering the two or more user photos of the set based on the times indicated by the two or more timestamps;
wherein identifying the user photo of the set to be the current photo comprises:
  utilizing the ordering of the two or more user photos of the set to identify the user photo of the set to be the current photo.

14. The method of claim 13, wherein ordering the two or more user photos of the set comprises:
  ordering the two or more user photos of the set from a most recently captured photo of the two or more user photos to an earliest captured photo of the two or more user photos.

15. The system of claim 1, wherein the processing unit is configured to execute the instructions to perform the operations further comprising:
  assign user photos of the set that are not associated with respective timestamps to a common event group that is different from each event group to which at least one user photo that is associated with a respective timestamp is assigned.

16. The method of claim 9, wherein
the first user photo qualifies to be assigned to the first subgroup when the first value is less than the second value; and
wherein the first user photo does not qualify to be assigned to the first subgroup when the first value is greater than the second value.

17. The method of claim 12, wherein determining whether the current photo is to be assigned to a subgroup of the current event group to which the standard photo is assigned comprises:
  determining that the current photo qualifies to be assigned to a plurality of subgroups of the current event group; and assigning the current photo to a specified subgroup of the plurality of subgroups based on a difference between the timestamp of the current photo and a timestamp of a user photo included in the specified subgroup being less than differences between the timestamp of the current photo and timestamps of other user photos in others of the plurality of subgroups.

18. The system of claim 1, further comprising:

determining that the first user photo qualifies to be assigned to a plurality of subgroups of the first event group;

wherein assigning the first user photo to the first event subgroup comprises:

assigning the first user photo to the first event subgroup further based on a difference between the first stamp and a time stamp with which a user photo included in the first event subgroup is associated being less than differences between the first time stamp and time stamps with which other user photos in others of the plurality of subgroups are associated.

19. The method of claim 9, further comprising:

comparing a name of the second user photo and a name of a third user photo in response to the third user photo not comprising GPS information and the difference between the second time at which the second user photo is captured and a third time at which the third user photo is captured being less than a maximum length of time; and assigning the third user photo to the specified subgroup in response to at least one of (a) a determination that the name of the second user photo and the name of the third user photo include common letters or (b) a determination that a first number that is included in the name of the second user photo and a second number that is included in the name of the third user photo are within a predefined range of each other.

20. The method of claim 9, further comprising:

comparing a storage folder of the second user photo and a storage folder of a third user photo to determine whether the storage folder of the second user photo and the storage folder of the third user photo are same, in response to at least one of (a) a determination that a name of the second user photo and a name of a third user photo do not include common letters or (b) a determination that a first number that is included in the name of the second user photo and a second number that is included in the name of the third user photo are not within a predefined range of each other; and assigning the third user photo to the specified subgroup in response to a determination that the storage folder of the second user photo and the storage folder of the third user photo are the same.

* * * * *